(12) United States Patent
Sako et al.

(10) Patent No.: US 7,126,892 B2
(45) Date of Patent: Oct. 24, 2006

(54) DATA RECORD MEDIUM, DATA RECORDING METHOD AND APPARATUS, AND DATA TRANSMITTING METHOD AND APPARATUS

(75) Inventors: Yoichiro Sako, Tokyo (JP); Markus Hendrikus Veltman, Tokyo (JP); Shunsuke Furukawa, Tokyo (JP); Tatsuya Inokuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 2 days.

(21) Appl. No.: 10/311,654

(22) PCT Filed: Apr. 15, 2002

(86) PCT No.: PCT/JP02/03722

§ 371 (c)(1),
(2), (4) Date: Sep. 15, 2003

(87) PCT Pub. No.: WO02/086890

PCT Pub. Date: Oct. 31, 2002

(65) Prior Publication Data
US 2004/0052191 A1    Mar. 18, 2004

(30) Foreign Application Priority Data
Apr. 19, 2001 (JP) ............... 2001-121425
Oct. 9, 2001 (JP) ............... 2001-311632

(51) Int. Cl.
G11B 7/00 (2006.01)
(52) U.S. Cl. ............... 369/47.22; 369/59.25
(58) Field of Classification Search ............ 369/47.22, 369/59.25, 275.3, 59.26; 386/45, 95, 96, 386/125, 126
See application file for complete search history.

(56) References Cited

U.S. PATENT DOCUMENTS

| | | | | |
|---|---|---|---|---|
| 5,953,375 A | * | 9/1999 | Nishiwaki et al. | 375/259 |
| 6,456,783 B1 | * | 9/2002 | Ando et al. | 386/125 |
| 6,584,277 B1 | * | 6/2003 | Tsumagari et al. | 386/95 |
| 2001/0005447 A1 | * | 6/2001 | Kawamura et al. | 386/95 |

FOREIGN PATENT DOCUMENTS

| | | |
|---|---|---|
| JP | 7-255032 | 10/1995 |
| JP | 2875232 | 1/1999 |
| JP | 2877780 | 1/1999 |

* cited by examiner

*Primary Examiner*—Andrea Wellington
*Assistant Examiner*—Lixi Chow
(74) *Attorney, Agent, or Firm*—Oblon, Spivak, McClelland, Maier & Neustadt, P.C.

(57) ABSTRACT

On a data recording medium which is divided into sectors and can be accessed on the sector unit basis, when encoded data is divided every predetermined length, a header is added, the data is packetized, a header is further added to the packet to thereby form the pack data, and the resultant data is recorded, if the stuffing is necessary, the stuffing data is inserted to the last of a data area of the packet. Thus, a length of pack header can be fixed. There is no need to provide a padding packet. A situation such that a PES header is encrypted is prevented and no problem occurs when encryption is performed.

59 Claims, 36 Drawing Sheets

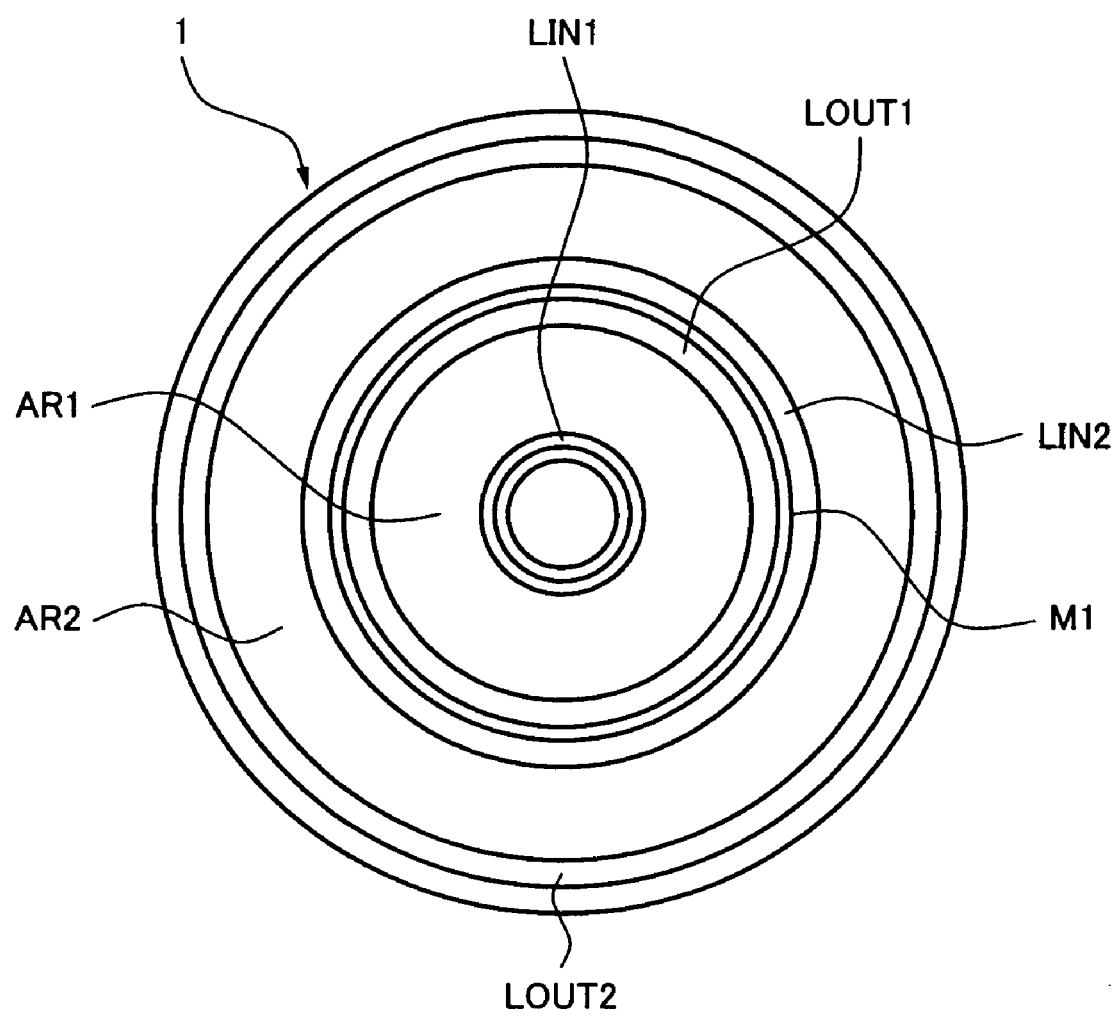

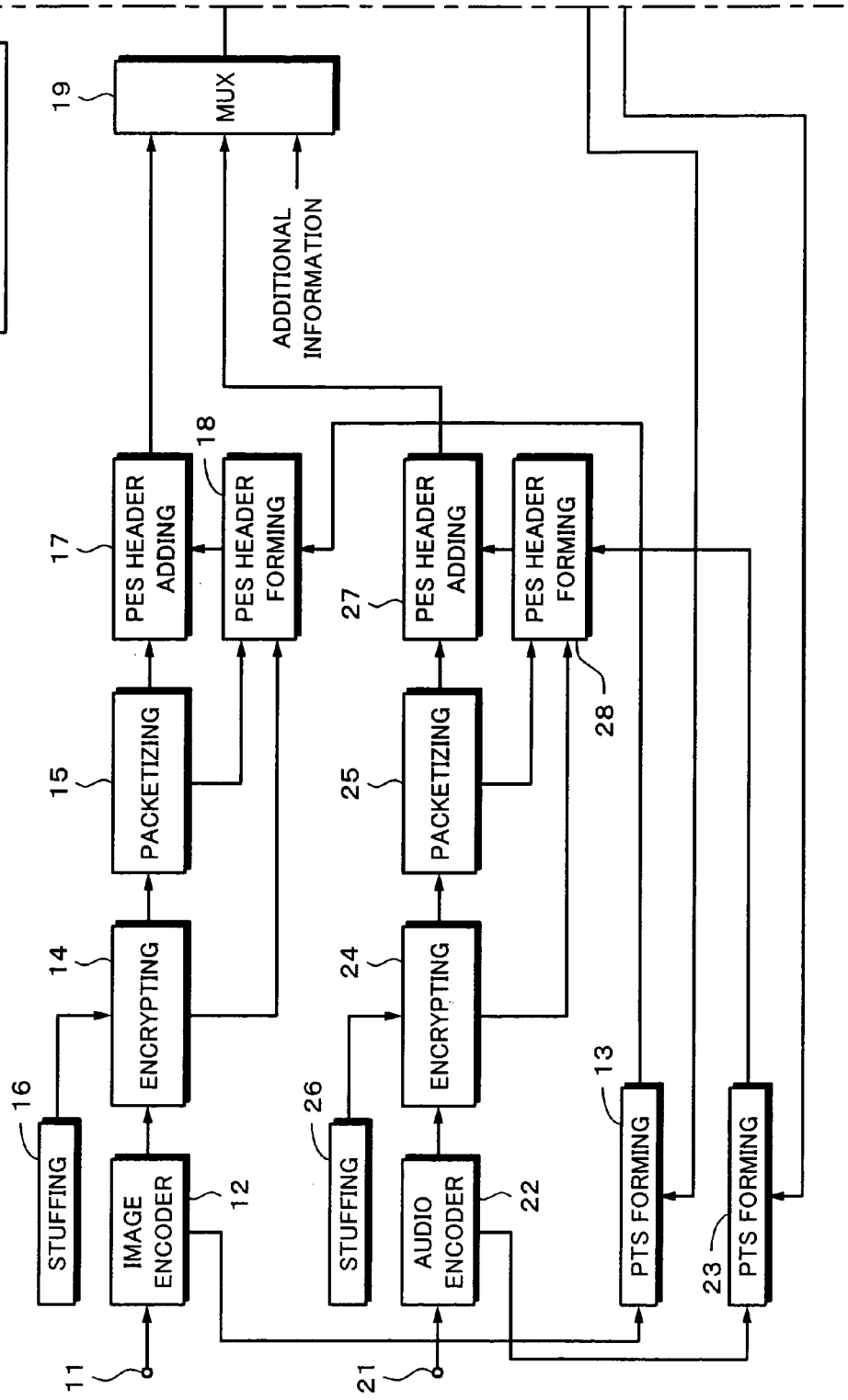

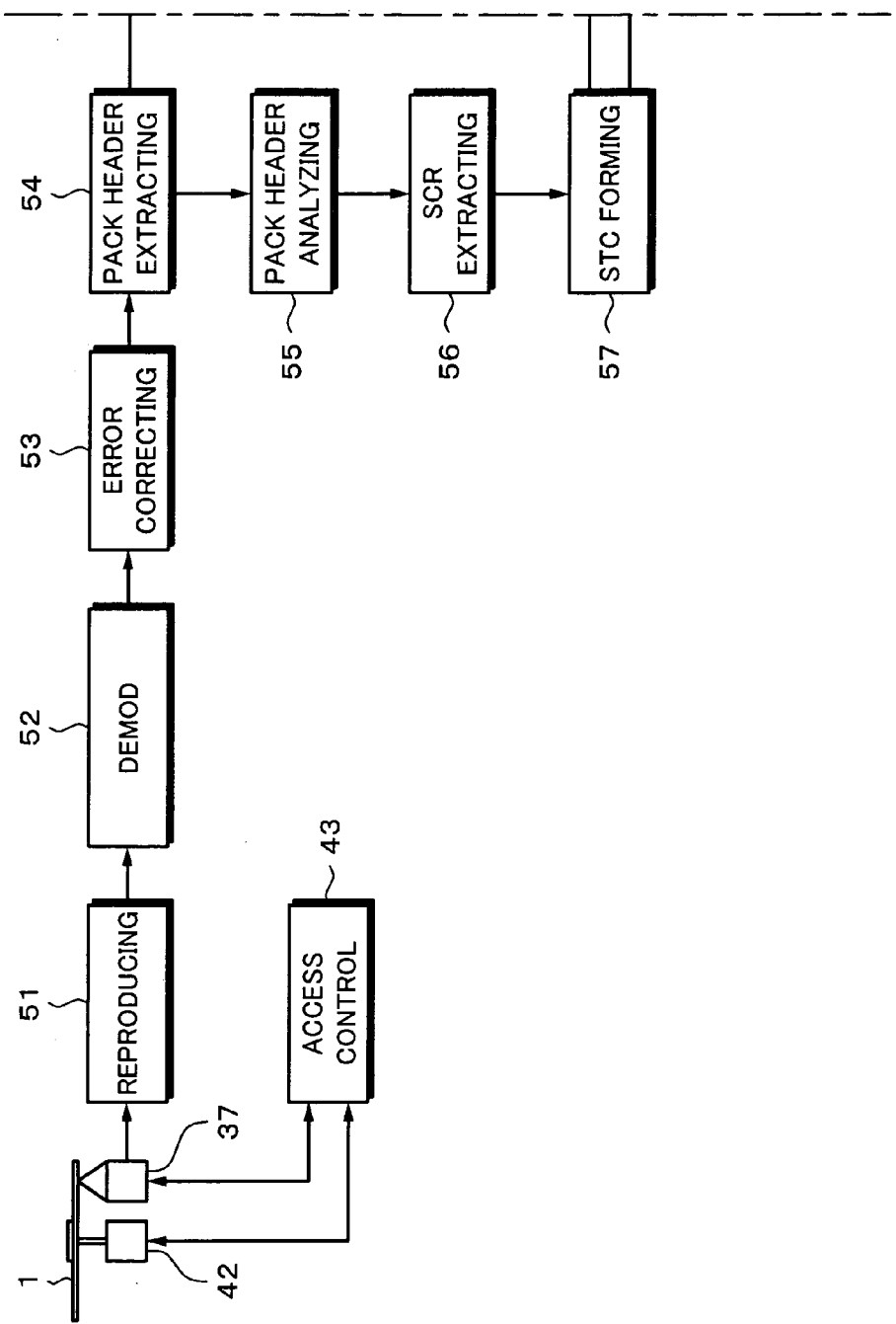

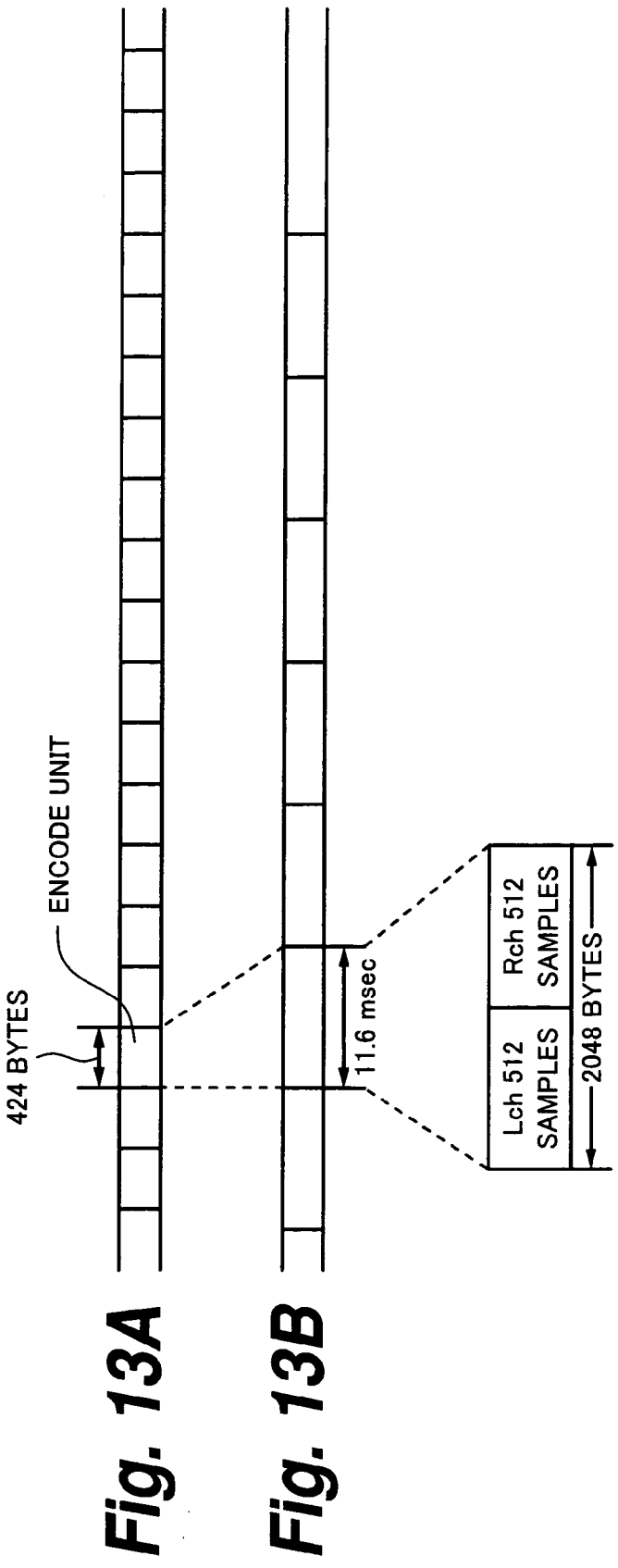

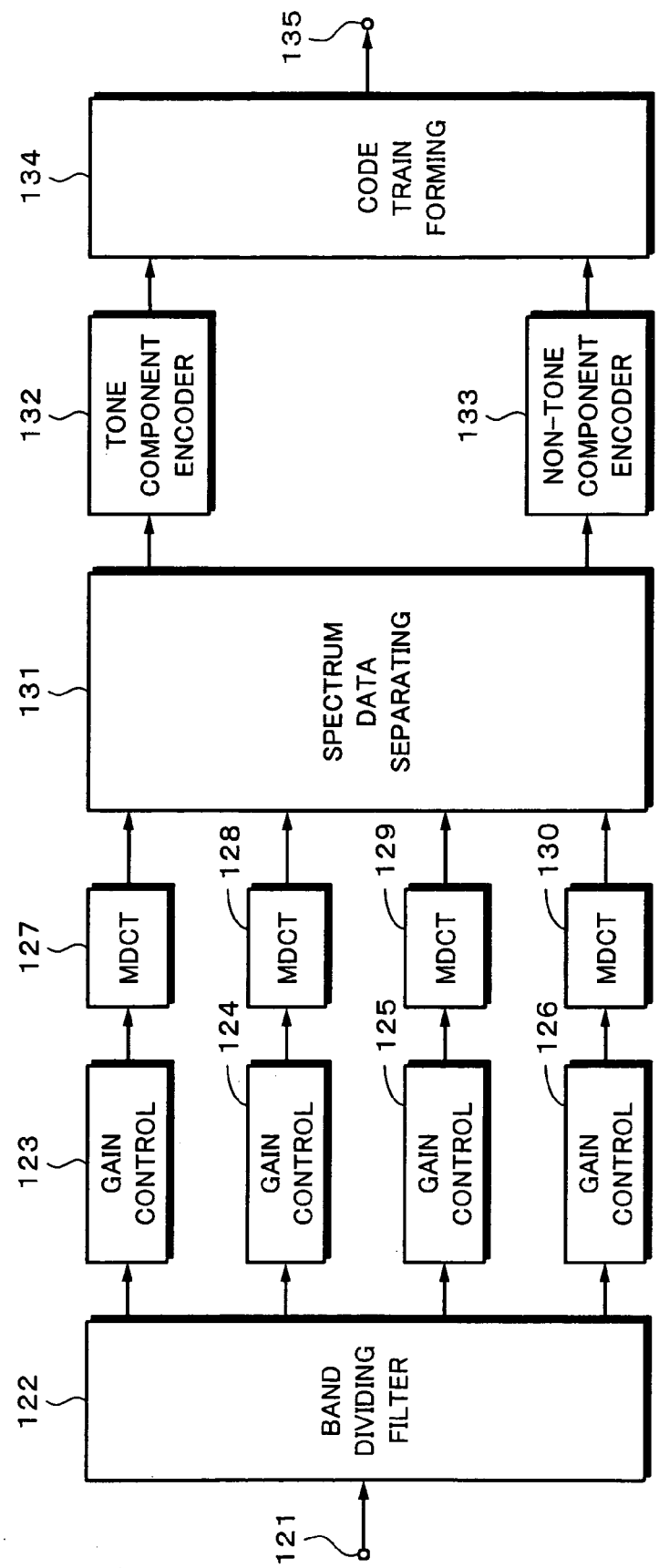

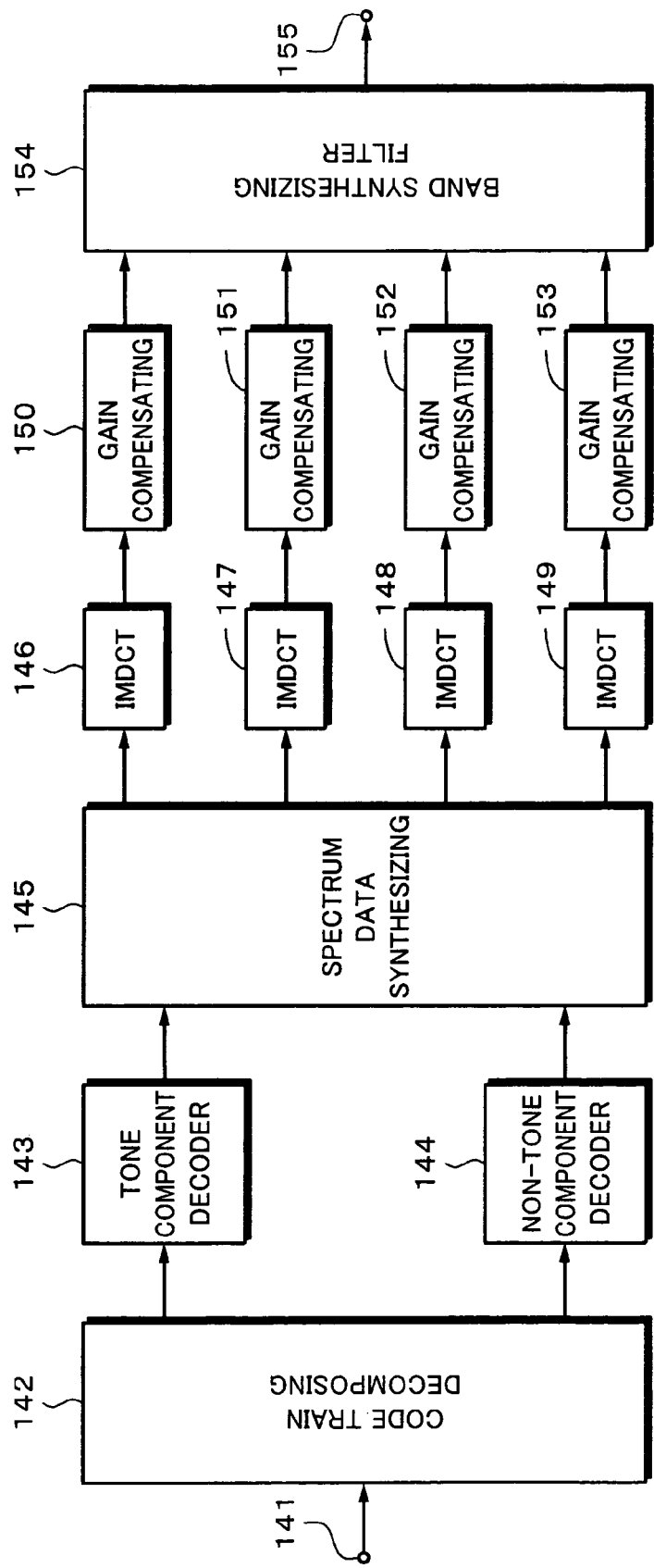

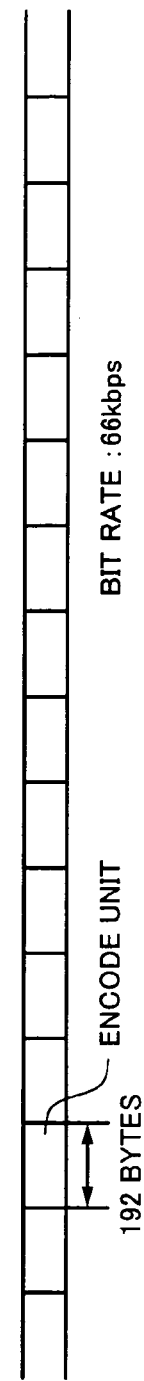
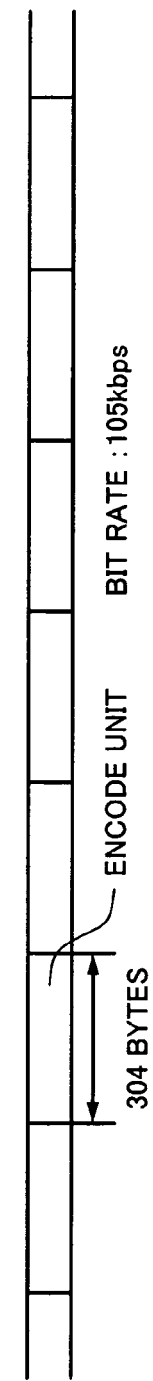
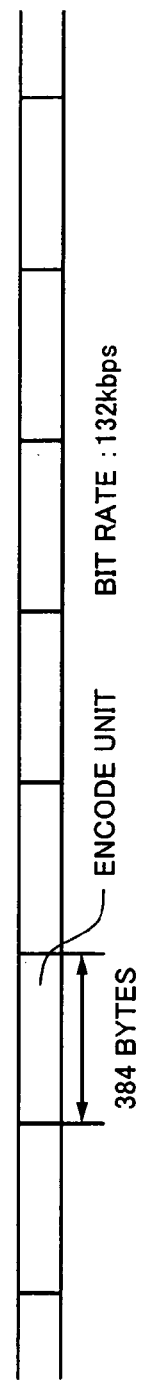

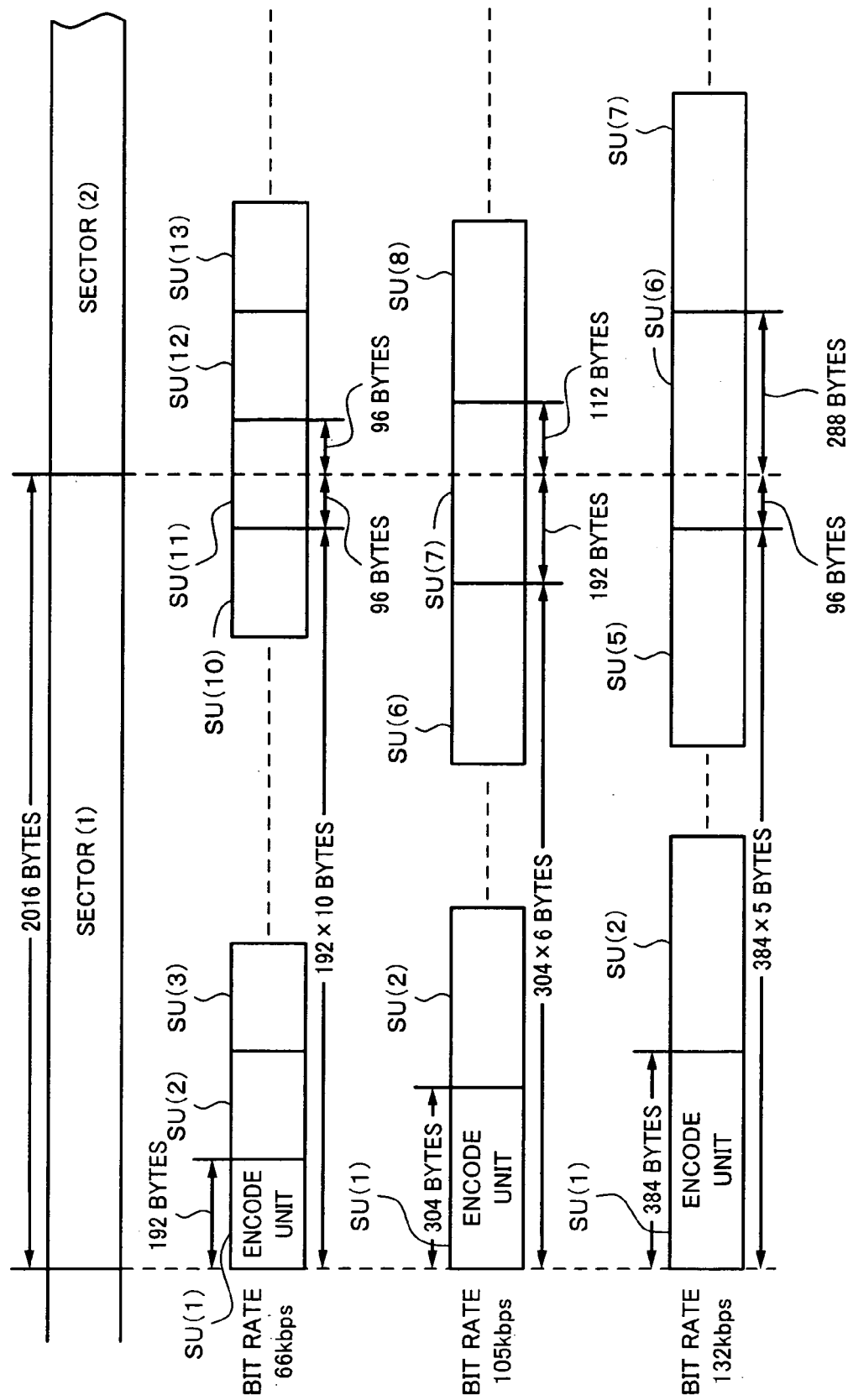

Fig. 18

| THE NUMBER OF BYTES OF 1 SECTOR | | THE NUMBER OF BYTES OF SOUND UNIT | |
|---|---|---|---|
| | | ENCODE UNIT(1) 192B | 1 — POINTER=1-1=0 |
| | | | 192 |
| | | ENCODE UNIT(2) 192B | 193 |
| | | | 384 |
| | | ENCODE UNIT(3) 192B | 385 |
| | SECTOR(1) 2016B | | 576 |
| | | ⋮ | |
| | | ENCODE UNIT(10) 192B | 1729 |
| | | | 1920 |
| 2016 | | ENCODE UNIT(11) 192B | 1921 |
| 2017 | | | 2112 — POINTER=2113-2017=96 |
| | | ENCODE UNIT(12) 192B | 2113 |
| | | | 2304 |
| | | ENCODE UNIT(13) 192B | 2305 |
| | SECTOR(2) 2016B | | 2496 |
| | | ⋮ | |
| | | ENCODE UNIT(21) 192B | 3841 |
| 4032 | | | 4032 |
| 4033 | ≈ | ≈ | ≈ |
| 14112 | | ENCODE UNIT(74) 192B | 14017 |
| 14113 | | | 14208 — POINTER=14209-14113=96 |
| | | ENCODE UNIT(75) 192B | 14209 |
| | | | 14400 |
| | | ENCODE UNIT(76) 192B | 14401 |
| | SECTOR(8) 2016B | | 14592 |
| | | ⋮ | |
| | | ENCODE UNIT(84) 192B | 15937 |
| 16128 | | | 16128 |

Fig. 19

| SECTOR No. | ENCODE UNIT POINTER |
|---|---|
| (1) | 0 |
| (2) | 96 |
| (3) | 0 |
| (4) | 96 |
| (5) | 0 |
| (6) | 96 |
| (7) | 0 |
| (8) | 96 |
| (1) | 0 |
| (2) | 96 |
| (3) | 0 |
| (4) | 96 |
| ⋮ | ⋮ |

Fig. 20

| THE NUMBER OF BYTES OF 1 SECTOR | | | THE NUMBER OF BYTES OF SOUND UNIT | |
|---|---|---|---|---|
| | SECTOR(1) 2016B | ENCODE UNIT(1) 304B | 1 / 304 | POINTER=1−1=0 |
| | | ENCODE UNIT(2) 304B | 305 / 608 | |
| | | ENCODE UNIT(3) 304B | 609 / 912 | |
| | | ⋮ | | |
| | | ENCODE UNIT(6) 304B | 1521 / 1824 | |
| 2016 / 2017 | | ENCODE UNIT(7) 304B | 1825 / 2128 | POINTER=2129−2017=112 |
| | SECTOR(2) 2016B | ENCODE UNIT(8) 304B | 2129 / 2432 | |
| | | ENCODE UNIT(9) 304B | 2433 / 2736 | |
| | | ⋮ | | |
| | | ENCODE UNIT(13) 304B | 3649 / 3952 | |
| 4032 / 4033 | | ENCODE UNIT(14) 304B | 3953 / 4032 | |
| ≈ | ≈ | ≈ | | |
| 14112 / 14113 | | ENCODE UNIT(47) 304B | 13985 / 14288 | POINTER=14289−14113=176 |
| | SECTOR(8) 2016B | ENCODE UNIT(48) 304B | 14289 / 14592 | |
| | | ENCODE UNIT(49) 304B | 14593 / 14986 | |
| | | ⋮ | | |
| | | ENCODE UNIT(53) 304B | 15809 / 16112 | |
| 16128 | | 16B | | |

Fig. 21

| SECTOR No. | ENCODE UNIT POINTER |
|---|---|
| (1) | 0 |
| (2) | 112 |
| (3) | 224 |
| (4) | 32 |
| (5) | 144 |
| (6) | 256 |
| (7) | 64 |
| (8) | 176 |
| (1) | 0 |
| (2) | 112 |
| (3) | 224 |
| (4) | 32 |
| ⋮ | ⋮ |

Fig. 22

| THE NUMBER OF BYTES OF 1 SECTOR | | THE NUMBER OF BYTES OF SOUND UNIT | |
|---|---|---|---|
| | | | 1    POINTER=1-1=0 |
| | ENCODE UNIT (1) 384B | 1 | |
| | | 384 | |
| | ENCODE UNIT (2) 384B | 385 | |
| | | 768 | |
| SECTOR (1) 2016B | ENCODE UNIT (3) 384B | 769 | |
| | | 1152 | |
| | ⋮ | | |
| | ENCODE UNIT (5) 384B | | |
| 2016 | ENCODE UNIT (6) 384B | 1921 | |
| 2017 | | 2304 | POINTER=2305-2017=288 |
| | ENCODE UNIT (7) 384B | 2305 | |
| | | 2688 | |
| | ENCODE UNIT (8) 384B | 2689 | |
| SECTOR (2) 2016B | | 3072 | |
| | ⋮ | | |
| | ENCODE UNIT (10) 384B | | |
| 4032 | ENCODE UNIT (11) 384B | 3841 | |
| 4033 | | 4224 | |
| ≈ | ≈ | ≈ | |
| 14112 | ENCODE UNIT (37) 384B | 13825 | |
| 14113 | | 14208 | POINTER=14209-14113=96 |
| | ENCODE UNIT (38) 384B | 14209 | |
| | | 14592 | |
| | ENCODE UNIT (39) 384B | 14593 | |
| SECTOR (8) 2016B | | 14976 | |
| | ⋮ | | |
| | ENCODE UNIT (42) 384B | 15745 | |
| 16128 | | 16128 | |

Fig. 23

| SECTOR No. | ENCODE UNIT POINTER |
|---|---|
| (1) | 0 |
| (2) | 288 |
| (3) | 192 |
| (4) | 96 |
| (5) | 0 |
| (6) | 288 |
| (7) | 192 |
| (8) | 96 |
| (1) | 0 |
| (2) | 288 |
| (3) | 192 |
| (4) | 96 |
| ⋮ | ⋮ |

DATA RECORD MEDIUM, DATA RECORDING METHOD AND APPARATUS, AND DATA TRANSMITTING METHOD AND APPARATUS

TECHNICAL FIELD

The invention relates to a recording medium which is divided into sectors of a predetermined length and can be accessed on a sector unit basis, data recording method and apparatus for recording data of contents onto such a recording medium, and data transmitting method and apparatus.

BACKGROUND ART

In recent years, development of an optical disc as a recording medium of a large capacity has been progressed. For example, a CD (Compact Disc) on which music information has been recorded, a CD-ROM in which data for a computer is recorded, a DVD (Digital Versatile Disc or Digital Video Disc) which handles video information, and the like are known.

The optical discs mentioned here are read only discs. In recent years, an optical disc on which data can be additionally written once or data can be rewritten like a CD-R (CD-Recordable) disc, a CD-RW (CD-Rewritable) disc, or the like has been put into practical use. Further, development of various optical discs such as double density CD whose recording capacity is increased while keeping a shape similar to that of a CD, CD2 in which an affinity of both of an ordinary CD player and a personal computer can be enhanced, and the like has been progressed.

The optical disc of CD2 has an area on the inner rim side and an area on the outer rim side. In the area on the inner rim side, for example, audio data has been recorded in a format similar to that of an ordinary CD-DA (CD digital Audio) so that it can be also reproduced by the ordinary CD player. In the area on the outer rim side, in order to realize an affinity with the personal computer, contents data is filed and recorded on the basis of the specification of the CD-ROM. A method of recording contents data of a multimedia comprising the audio data and image data onto such an optical disc of CD2 in accordance with the specification of MPEG2-PS is considered. As a compression system of the audio data, for example, use of ATRAC3 is considered.

As a compression system of the audio data, there are known: a subband system in which the inputted audio data in the time base direction is divided into a plurality of bands by a band dividing filter and compression encoded; a transform encoding system in which the inputted audio data in the time base direction is transformed into data in the frequency base direction by an orthogonal function such as a DCT or the like and compression encoded; and a hybrid system in which both of those systems are combined. ATRAC3 is an audio compression system which belongs to the hybrid system. In ATRAC3, the audio data cut out by a predetermined time window is band divided and MDCT transformed, so that the compression encoding is executed.

When a sampling frequency of the audio data is assumed to be, for instance, 44.1 kHz and a time window is assumed to be, for instance, 11.6 msec, the audio data of 512 samples is cut out by such a time window. Assuming that one sample consists of 16 bits, the encoding is executed every 2048 bytes. In ATRAC3, since adaptive bit allocation is performed, it is possible to arbitrarily cope with a bit rate. When a transmission bit rate is equal to 66 kbps, one encode unit is compressed to 192 bytes. When the transmission bit rate is equal to 105 kbps, one encode unit is compressed to 304 bytes. When the transmission bit rate is equal to 132 kbps, one encode unit is compressed to 384 bytes.

In CD-ROM Mode-1, a subcode block consisting of 98 frames is set to a sector and data is recorded on a sector unit basis. A size of one sector is equal to 2352 bytes and a data recording capacity among them is equal to 2048 bytes. In the case of recording the stream of MPEG2-PS, a PES header of a packet layer is added to the data and, further, a pack header is added to a pack layer.

In the specification of MPEG2-PS, stuffing can be performed to the pack header. A padding packet can be inserted. That is, when an edit is performed or the like, there is a case where the recording data is dropped. There is also a case where an amount of data which is stored into one packet differs in accordance with circumstances of encoding. In such a case, to make a data length constant, the stuffing is inserted into the pack header or the padding packet is inserted.

However, if the stuffing bytes of the pack header are used, a length of header is not constant and a problem such that the start position of the packet data and the information of the PES packet cannot be easily detected.

That is, as shown in FIG. 35A, if no stuffing is inserted to the pack header, although a length in a range from the head of one pack to the head of the data of the packet is equal to LA1, when the stuffing is performed to the pack header, the length in the range from the head of one pack to the head of the data of the packet is equal to LA2. As mentioned above, if the stuffing is performed to the pack header, since the length in the range from the head of one pack to the head of the data of the packet changes, it is difficult to detect the head of the data of the packet on the basis of the length in the range from the head of one pack to the head of the data of the packet.

For example, a scrambling control flag has been described in the PES header. If the data has been encrypted in order to protect the contents, first, it is necessary to detect the scrambling control flag.

If the pack header is set to a fixed length, the scrambling control flag is certainly located at a position that is away from the head of one pack by a desired number. Therefore, the scrambling control flag can be immediately obtained by extracting the information at the position that is away from the head of one pack by a desired length.

However, as shown in FIG. 36A, if a mode to perform the stuffing to the pack header is set, although a length in a range from the head of one pack to the scrambling control flag is equal to LB1 when no stuffing is performed, by performing the stuffing to the pack header, as shown in FIG. 36B, the length in the range from the head of one pack to the scrambling control flag is equal to LB2. As mentioned above, if the mode to perform the stuffing to the pack header is set, since the length in the range from the head of one pack to the scrambling control flag changes, it is difficult to detect the scrambling control flag on the basis of the length from the head of one pack.

As mentioned above, the stuffing of the pack header causes a problem such that the header is set to a variable length and it is impossible to detect the start position of the packet data or the information of the PES packet on the basis of the length from the pack header.

As shown in FIG. 37, as a PES header, it is necessary to provide a packet start code of 32 bits and a packet length of 16 bits for the padding packet. Therefore, the padding packet has a data length of at least 6 bytes. In the padding packet, the padding or stuffing of the number of bits smaller than 6 bytes cannot be performed.

As shown in FIG. 37, only the packet start code and the packet length are described in the PES header of the padding packet, and various information such as a scrambling control flag and the like cannot be described. Therefore, the scrambling control depends on the previous PES packet.

Therefore, as shown in FIG. 38, if the previous packet has been encrypted, according to the padding packet, it is encrypted together with the PES header. However, if the PES header of the padding packet is encrypted, there is a possibility such that the start position and length of the padding packet are unclear and the correct decoding cannot be performed.

It is, therefore, an object of the invention to provide a data recording medium, data recording method and apparatus, and data transmitting method and apparatus, in which a length of header can be fixed and the head of the data and the position of the scrambling control flag can be easily detected.

Another object of the invention is to provide a data recording medium, data recording method and apparatus, and data transmitting method and apparatus, in which stuffing and padding of a small number of bits can be performed and no trouble of encryption occurs.

DISCLOSURE OF INVENTION

According to the invention, there is provided a data recording medium which is divided into sectors of a predetermined length and can be accessed on the sector unit basis and on which contents data is recorded, wherein encoded contents data is divided every predetermined length, a header is added, and the data is packetized, a header is further added to the packet to thereby form pack data, the data which has been packetized and further formed as pack data is recorded into each of the sectors in correspondence to the sectors, and when a size of the data which has been packetized and further formed as pack data does not correspond to a size of sector, the header is set to a fixed length and stuffing data is inserted into the data of the packet.

According to the invention, there is provided a data recording method of recording contents data onto a recording medium which is divided into sectors of a predetermined length and can be accessed on the sector unit basis, comprising the steps of: dividing encoded contents data every predetermined length, adding a header, and packetizing; further adding a header to the packet to thereby form pack data; recording the data which has been packetized and further formed as pack data into each of the sectors on the recording medium in correspondence to the sectors; and when stuffing data is inserted, setting the header to a fixed length and inserting the stuffing data into the data of the packet.

According to the invention, there is provided a data recording apparatus for recording contents data onto a recording medium which is divided into sectors of a predetermined length and can be accessed on the sector unit basis, comprising: means for dividing encoded contents data every predetermined length, adding a header, and packetizing; means for further adding a header to the packet to thereby form pack data; means for recording the data which has been packetized and further formed as pack data into each of the sectors on the recording medium in correspondence to the sectors; and means for, when stuffing data is inserted, setting the header to a fixed length and inserting the stuffing data into the data of the packet.

According to the invention, there is provided a data transmitting method comprising the steps of: dividing encoded contents data every predetermined length, adding a header, and packetizing; further adding a header to the packet to thereby form pack data; transmitting the data which has been packetized and further formed as pack data; and when stuffing data is inserted, setting the header to a fixed length and inserting the stuffing data into the data of the packet.

According to the invention, there is provided a data transmitting apparatus comprising: means for dividing encoded contents data every predetermined length, adding a header, and packetizing; means for further adding a header to the packet to thereby form pack data; means for transmitting the data which has been packetized and further formed as pack data; and means for, when stuffing data is inserted, setting the header to a fixed length and inserting the stuffing data into the data of the packet.

On the recording medium which is divided into the sectors of the predetermined length and can be accessed on the sector unit basis, when the encoded contents data is divided every predetermined length, the header is added, the data is packetized, the header is further added to thereby form the pack data, and the data is recorded, if the stuffing is necessary, the stuffing data is inserted into, for example, the last of a data area of the packet. The information of the stuffing is described in, for example, a CD2 stream header and its length is described in, for example, the last of the data. Therefore, there is no need to perform the stuffing to the pack header and the length of pack header can be fixed. Thus, the start position of the packet data can be easily detected. The scrambling control flag added to the packet header can be easily extracted and the decrypting process of the encryption becomes easy.

The stuffing data is inserted into, for example, the last of the data area of the packet. Thus, there is no need to provide the padding packet. Since the padding packet is not used, the data of small padding or stuffing less than 6 bytes can be inserted. Since such a padding packet is not provided, a situation such that the PES header is encrypted is prevented and no problem occurs when the encryption is performed.

BRIEF DESCRIPTION OF DRAWINGS

FIG. 1 is a schematic diagram showing a construction of an optical disc of CD2.

FIGS. 2A and 2B are block diagrams showing a construction of a recording system of an optical disc recording and reproducing apparatus to which the invention can be applied.

FIGS. 3A and 3B are block diagrams showing a construction of a reproducing system of the optical disc recording and reproducing apparatus to which the invention can be applied.

FIGS. 13A and 13B are schematic diagrams for use in explanation of the ATRAC decoder.

FIG. 14 is a block diagram showing a construction of an ATRAC3 encoder.

FIG. 15 is a block diagram showing a construction of an ATRAC3 decoder.

FIGS. 16A to 16C are schematic diagrams for use in explanation of encode units of ATRAC3.

FIG. 17 is a schematic diagram showing a relation between the encode units and sectors.

FIG. 18 is a schematic diagram showing a relation between the encode units and the sectors.

FIG. 19 is a schematic diagram showing a relation between the encode units and the sector numbers.

FIG. 20 is a schematic diagram showing a relation between the encode units and the sectors.

FIG. 21 is a schematic diagram showing a relation between the encode units and the sector numbers.

FIG. 22 is a schematic diagram showing a relation between the encode units and the sectors.

FIG. 23 is a schematic diagram showing a relation between the encode units and the sector numbers.

BEST MODE FOR CARRYING OUT THE INVENTION

Figure 2B:
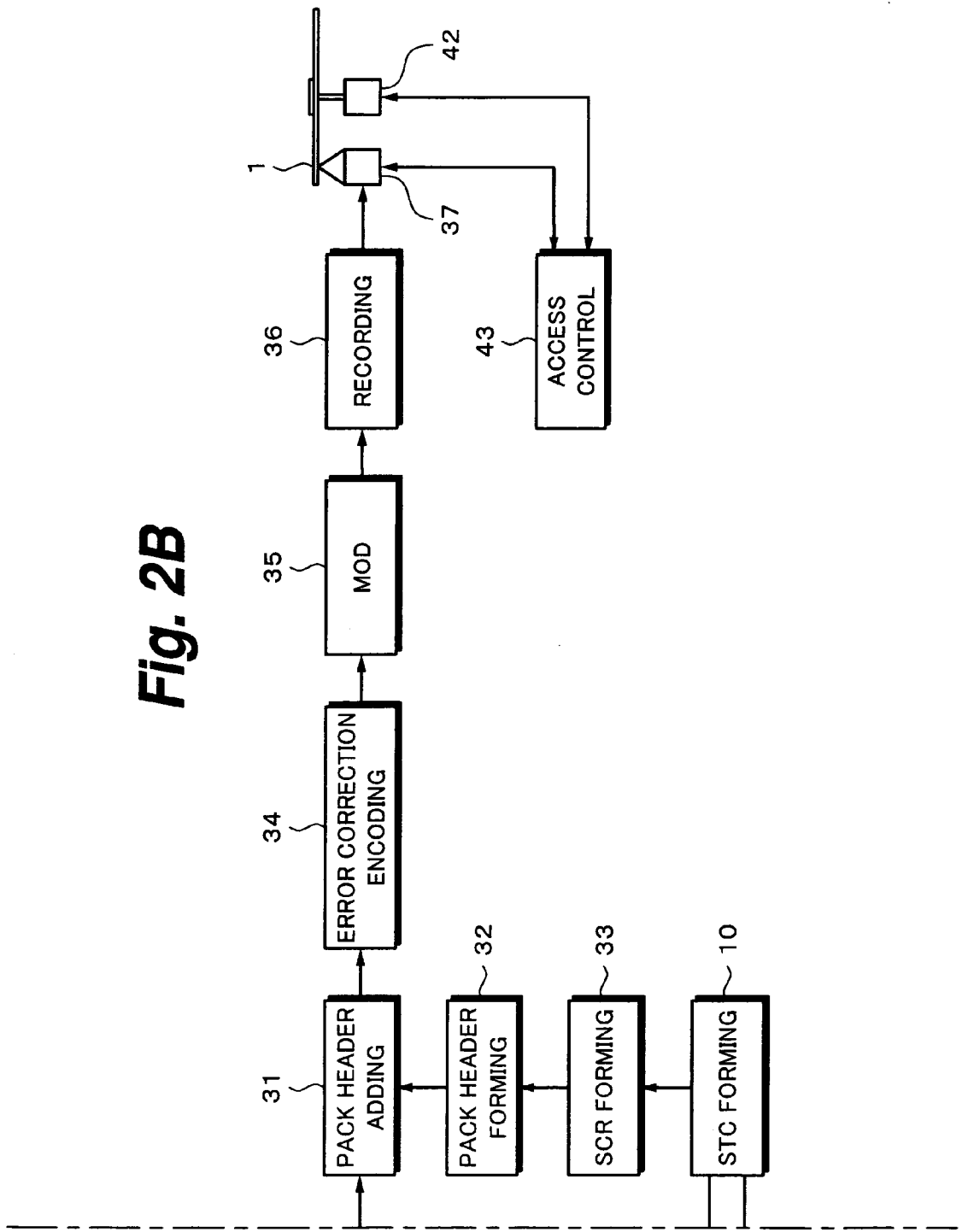

An embodiment of the invention will be described hereinbelow with reference to the drawings. The invention is suitable for use in the case of recording/reproducing contents data onto/from an optical disc of, for example, CD (Compact Disc) 2.

FIG. 1 shows a construction of an external view of an optical disc 1 of CD2 to which the invention can be applied. The CD2 is an optical disc having a diameter of, for example, 120 mm in a manner similar to the ordinary CD. It is also possible to use an optical disc whose diameter is equal to 8 mm like what is called a single CD.

CD2 has been developed in consideration of an affinity with both of the existing CD player and a personal computer. According to the optical disc 1 of CD2 as mentioned above, as shown in FIG. 1, a center hole is formed at the center, an area AR1 is formed on the inner rim side, and an area AR2 is further formed on the outer rim. A mirror portion M1 is formed between the area AR1 on the inner rim side and the area AR2 on the outer rim side. The area AR1 on the inner rim side and the area AR2 on the outer rim side are separated by the mirror portion M1. A lead-in area LIN1 is formed on the innermost rim of the area AR1 on the inner rim side and a lead-out area LOUT1 is formed on the outermost rim thereof. A lead-in area LIN2 is formed on the innermost rim of the area AR2 on the outer rim side and a lead-out area LOUT2 is formed on the outermost rim thereof.

The area AR1 on the inner rim side is an area having an affinity with the existing CD player. In this area AR1, for example, audio data has been recorded in a format similar to that of an ordinary CD-DA (CD Digital Audio) so that the data can be reproduced even by an ordinary CD player. In the area AR1 on the inner rim side, usually, encryption of contents data is not performed so that the data can be handled in a manner similar to the ordinary CD-DA. Naturally, in order to protect a copyright, a case of encrypting the data which is recorded into the area AR1 on the inner rim side is also considered. Data such as video data, computer program data, or the like other than the audio data can be also recorded into the area AR1 on the inner rim side. It is also possible to compress and record data of contents into the area AR1 on the inner rim side.

On the other hand, the area AR2 on the outer rim side is an area having an affinity with a personal computer. In this area AR2, data can be recorded at a double density. For example, contents data of a multimedia such as audio data or image data is recorded in the area AR2 on the basis of the specification of MPEG (Moving Picture Coding Experts Group) 2-PS (Program Stream). As a compression system of the audio data, the ATRAC (Adaptive TRansform Acoustic Coding) 3 system, the MP3 (MPEG1 Audio Layer-3) system, or the AAC (MPEG2 Advanced Audio Coding) system is used. As a compression system of the image data, the JPEG (Joint Photographic Experts Group) system (still image) or MPEG2 system (motion image) is used. To protect a copyright, it is desirable to encrypt and record the contents data into the outer rim area.

As mentioned above, the optical disc 1 of CD2 can be reproduced by the CD player by using the area AR1 on the inner rim side in a manner similar to the ordinary CD, and data can be handled by using the area AR2 on the outer rim side while interlocking with the personal computer or portable player.

The invention is suitable when it is used for recording/reproducing contents data onto/from such an optical disc 1 of CD2, particularly, the area AR2 on the outer rim side.

FIG. 2 shows a construction of a recording system of an optical disc recording/reproducing apparatus to which the invention can be applied. In the recording system, contents data of a multimedia comprising a motion image, a still image, and audio data is recorded onto the optical disc 1 of CD2 in accordance with the specification of MPEG2-PS.

In FIG. 2, a stream of the image data is supplied to an input terminal 11 and a stream of the audio data is supplied to an input terminal 21. The stream of the image data from the input terminal 11 is supplied to an image encoder 12. The stream of the audio data from the input terminal 21 is supplied to an audio encoder 22.

The image data is compression encoded by the image encoder 12. As a compression system of the image data, in the case where the input image data is a still image, for example, the JPEG system is used and, in the case of the motion image, the MPEG2 system is used.

According to the JPEG system, the still image data is compression encoded by DCT (Discrete Cosine Transform) transformation. According to the MPEG2 system, the motion image data is compression encoded by motion compensation predictive encoding and DCT transformation.

Time information at the time when the image data is compression encoded is supplied to a PTS (Presentation Time Stamp) forming circuit 13. Time information serving as a reference of the system is sent from an STC (System Time Clock) forming circuit 10 to the PTS forming circuit 13. A PTS serving as a reference time upon reproduction of the image data is formed by the PTS forming circuit 13 on the basis of the system reference time information from the STC forming circuit 10.

An output of the image encoder 12 is supplied to an encrypting circuit 14. In the case of the contents data such as image data or audio data, there is a case where an encryption is necessary for protecting the copyright. The image data which is outputted from the image encoder 12 is encrypted by the encrypting circuit 14 as necessary. An output of the encrypting circuit 14 is supplied to a packetizing circuit 15.

In the encrypting circuit 14, for example, a system of a block encryption such as DES (Data Encryption Standard) or triple DES is used as an encryption system. According to the block encryption, for instance, an encryption is performed on an 8-byte unit basis. The DES is a typical common key encryption, data of 64 bits (8 bytes) is subjected to an initial transposition (scramble), and the data each consisting of 32 bits is sequentially non-linear processed by 16 keys formed from one encryption key of 56 bits and subjected again to the transposition, thereby encrypting the data. Naturally, the encryption system is not limited to such a block encryption.

At this time, stuffing is executed as necessary by stuffing data from a stuffing generating circuit 16. The stuffed portions are filled with data of all "1" or all "0". When the stuffed portions are encrypted, the stuffing data becomes data like random numbers. The stuffing is not limited to a fixed value but can be also executed by random numbers in consideration of the security. The stuffing will be explained hereinlater.

The packetizing circuit 15 divides the image data into a predetermined number of data so that it can be stored into the packet of MPEG2-PS. That is, as will be explained hereinlater, in MPEG2-PS, data of one pack and one packet is arranged into one sector on the standard of the CD-ROM. In this example, the data of one packet is set to 2016 bytes. Therefore, the image data is divided every 2016 bytes by the packetizing circuit 15.

An output of the packetizing circuit 15 is supplied to a PES header adding circuit 17. A PES header is supplied from a PES header forming circuit 18 to the PES header adding circuit 17. For example, a PES header of 14 bytes is added to the data of one packet of 2016 bytes by the PES header adding circuit 17.

As will be explained hereinlater, a stream ID, a scrambling control flag, a PTS, and the like are included in the PES header. In the case where the contents is encrypted, scrambling information is sent from the encrypting circuit 14 to the PES header forming circuit 18. On the basis of it, the scrambling control flag is added to the PES header. A PTS is formed by the PES forming circuit 13. On the basis of it, PTS information is added to the PES header. An output of the PES header adding circuit 17 is supplied to a multiplexer 19.

Further, in the embodiment of the invention, for example, a CD2 stream header of 4 bytes is added after the PES header of 14 bytes by the PES header adding circuit 17. An encode unit pointer, a stuffing ID, an edit ID, and the like are recorded in the CD2 stream header. The CD2 contents header will be explained in detail hereinlater.

The audio data is compression encoded by the audio encoder 22. ATRAC3, MP3, AAC, or the like is used as a compression system of the audio data. Naturally, ATRAC, ATRAC2, MPEG1 audio (MPEG1 Audio Layer-1, MPEG1 Audio Layer-2), or the like can be also used. Various compression systems such as TwinVQ, RealAudio, WMA, and the like have been also developed and they can be also similarly used.

As a compression system of the audio data, there are known: the subband system in which the inputted audio data in the time base direction is divided into a plurality of bands by a band dividing filter and compression encoded; the transform encoding system in which the inputted audio data in the time base direction is transformed into spectrum data in the frequency base direction by the orthogonal function such as a DCT or the like and compression encoded; and a hybrid system in which both of those systems are combined. The MPEG1 audio (MPEG1 Audio Layer-1, MPEG1 Audio Layer-2) belong to the subband encoding system. ATRAC, ATRAC2, ATRAC3, MP3, and AAC belong to the hybrid system.

Time information at the time when the audio data is compression encoded is supplied from the audio encoder 22 to a PTS forming circuit 23. The time information serving as a reference of the system is sent from the STC forming circuit 10 to the PTS forming circuit 23. A PTS serving as a reference time upon reproduction of the audio data is formed by the PTS forming circuit 23 on the basis of the system reference time information from the STC forming circuit 10.

An output of the audio encoder 22 is supplied to an encrypting circuit 24. The audio data which is outputted from the audio encoder 22 is encrypted by the encrypting circuit 24 as necessary. An output of the encrypting circuit 24 is supplied to a packetizing circuit 25.

In the encrypting circuit 24, for example, a system of a block encryption such as DES or triple DES is used as an encryption system. The encryption system is not limited to such a block encryption.

At this time, stuffing is executed as necessary by the stuffing data from the stuffing generating circuit 16. The stuffed portions are filled with data of all "1" or all "0". When the stuffed portions are encrypted, the stuffing data becomes data like random numbers. Naturally, the stuffing is not limited to fixed data but can be also executed by random numbers in consideration of the security. The stuffing will be explained hereinlater.

The packetizing circuit 25 divides the audio data into a predetermined number of data so that it can be stored into the packet of MPEG2-PS. In this example, the audio data is divided every 2016 bytes by the packetizing circuit 25.

An output of the packetizing circuit 25 is supplied to a PES header adding circuit 27. A PES header is supplied from a PES header forming circuit 28 to the PES header adding circuit 27. For example, a PES header of 14 bytes is added to the data of one packet of 2016 bytes by the PES header adding circuit 27.

A stream ID, a scrambling control flag, a PTS, and the like are included in the PES header. In the case where the contents is encrypted, scrambling information is sent from the encrypting circuit 24 to the PES header forming circuit 28. On the basis of it, the scrambling control flag is added to the PES header. A PTS is formed by the PTS forming circuit 23. On the basis of it, PTS information is added to the PES header.

Further, in the embodiment of the invention, at this time, a CD2 stream header is added by the PES header adding circuit 27. An encode unit pointer, a stuffing ID, an edit ID, and the like are recorded in the CD2 stream header. An output of the PES header adding circuit 27 is supplied to the multiplexer 19.

The image data packet which has been compression encoded by the image encoder 12, encrypted by the encrypting circuit 14, and packetized by the packetizing circuit 15 and the PES header adding circuit 17 and the audio data data which has been compression encoded by the audio encoder 22, encrypted by the encrypting circuit. 24, and packetized by the packetizing circuit 25 and the PES header adding circuit 27 are supplied to the multiplexer 19. A program packet comprising other additional information is also supplied. Those image packet, audio packet, and program packet are multiplexed by the multiplexer 19.

An output of the multiplexer 19 is supplied to a pack header adding circuit 31. Pack header information is supplied from a pack header forming circuit 32 to the pack header adding circuit 31. A pack header is added to each packet by the pack header adding circuit 31.

As will be explained hereinlater, an SCR (system Clock Reference) for calibrating the time of the system, a multiplexing rate, and the like are inserted into the pack header. The SCR is formed by an SCR forming circuit 33 on the basis of an output of the STC forming circuit 10. This SCR is supplied to the pack header forming circuit 32.

An output of the pack header adding circuit 31 is supplied to an error correction encoding circuit 34. The error correction encoding circuit 34 executes an error correction encoding process to the recording data by a CIRC (Cross Interleave Reed-Solomon Code) in accordance with CD-ROM Mode-1.

In the CD-ROM, a subcode block consisting of 98 frames is handled as one sector.

That is, subcodes of channels P to W have been inserted in the CD. The subcode has been coded by setting 98 frames into one block. Information of the subcode is used upon accessing. Therefore, the subcode block consisting of 98 frames is set to an access unit.

In the CD-ROM, the subcode block consisting of 98 frames is handled as one sector. A physical capacity of one sector is equal to 2352 bytes. In the case of CD-ROM Mode-1, auxiliary data of 288 bytes is added and recorded for error detection and correction. A sync of 12 bytes and a header of 4 bytes are provided at the head of each sector.

Therefore, according to the specification of CD-ROM Mode-1, a data recording capacity of one sector is equal to 2352−288−12−4=2048 bytes As will be explained hereinlater, a size of pack which is outputted from the pack header adding circuit 31 comprises a pack header of 14 bytes, a PES header of 14 bytes, a CD2 stream header of 4 bytes, and data (payload) of 2016 bytes and is equal to 14+14+4+2016=2048 bytes This value coincides with the data capacity (2048 bytes) of one sector in CD-ROM Mode-1.

An output of the error correction encoding circuit 34 is supplied to a modulating circuit 35. The recording data is modulated by a predetermined modulating system by the modulating circuit 35. An output of the modulating circuit 35 is supplied to an optical pickup 37 via a recording circuit 36.

The optical disc 1 is a disk of CD2 as mentioned above. The optical disc 1 is rotated by a spindle motor 42. A spindle servo circuit for controlling the rotation of the optical disc 1, a tracking servo circuit for controlling the optical pickup 37 in the radial direction of the optical disc 1, and a focusing servo circuit for controlling a beam from the optical pickup 37 in the optical axial direction are provided. Those circuits are controlled by an access control circuit 43.

In the case of recording data, the optical pickup 37 is accessed to the sector at a desired recording position on the optical disc 1 by the access control circuit 43. A laser beam modulated on the basis of the recording data from the recording circuit 36 is outputted from the optical pickup 37 toward the optical disc 1. Thus, the data is recorded onto the optical disc 1.

Figure 3B:
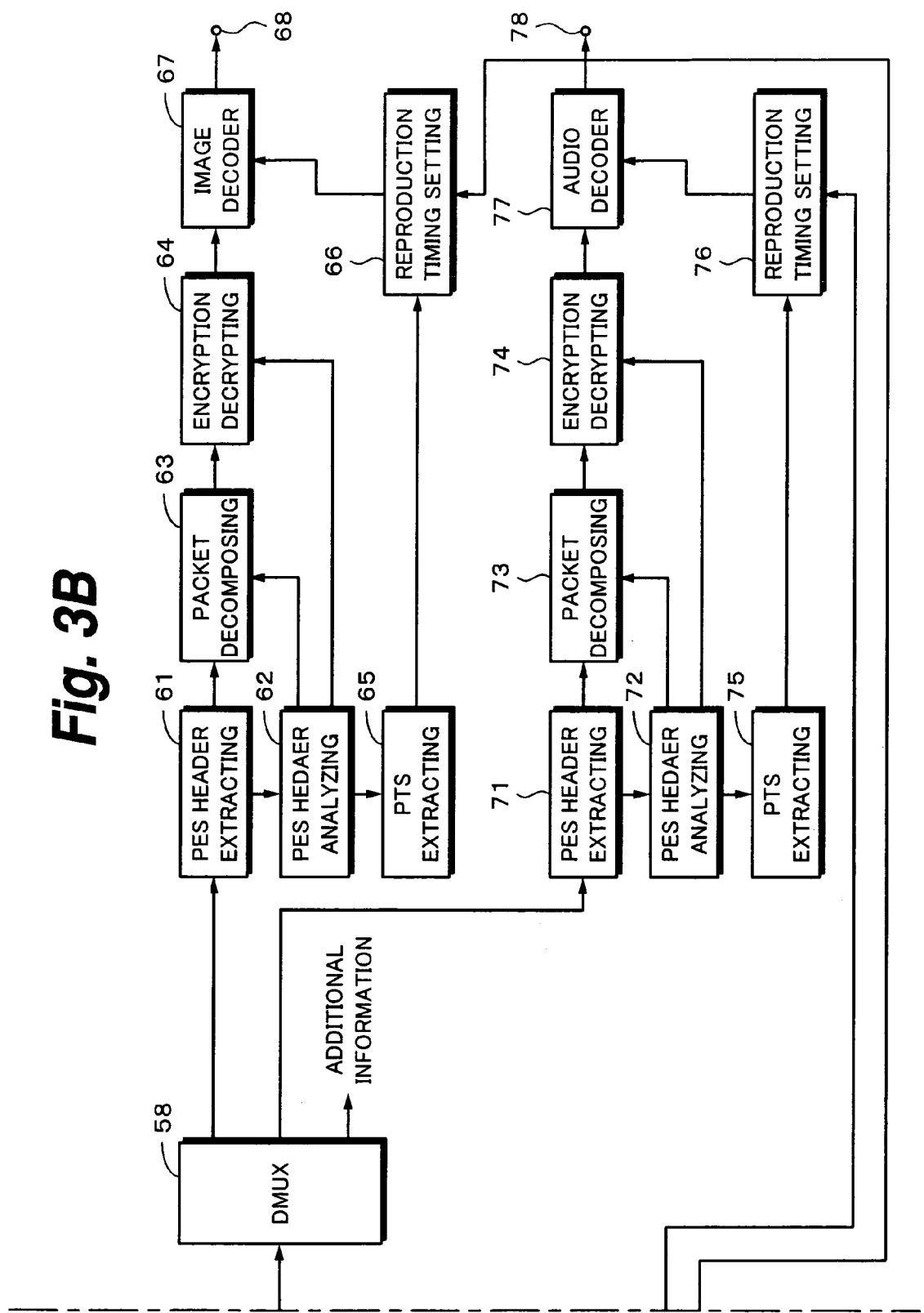

FIG. 3 shows a construction of a reproducing system of the optical disc recording/reproducing apparatus to which the invention can be applied. In FIG. 3, upon reproduction, the optical pickup 37 is accessed to the sector at a desired reproducing position on the optical disc 1 by the access control circuit 43. The data of one pack and one packet has been recorded in one sector on the optical disc 1 and the disc can be accessed on a sector unit basis.

The recording data on the optical disc 1 is read by the optical pickup 37. The reproduction data from the optical pickup 37 is supplied to a demodulating circuit 52 via a reproducing circuit 51. The demodulating circuit 52 executes a demodulating process of a modulating system corresponding to the modulating circuit 35 in FIG. 2. An output of the demodulating circuit 52 is supplied to an error correcting circuit 53. In the error correcting circuit 53, an error correcting process by the CIRC is executed and the data of each sector is decoded.

As mentioned above, the data of one pack and one packet has been recorded in one sector. The pack header of 14 bytes and the PES header of 14 bytes are added to the head of the data of one sector. Further, the CD2 stream header is added.

The reproduction data of one sector is supplied to a pack header extracting circuit 54. The pack header existing at the head of the data of 2016 bytes corresponding to one sector is extracted by the pack header extracting circuit 54. The extracted pack header is supplied to a pack header analyzing circuit 55.

The SCR and the multiplexing rate have been inserted into the pack header. The SCR of the pack header is extracted by an SCR extracting circuit 56 and supplied to an STC forming circuit 57. A value of a counter which is counted up by a system clock is compared with a value of the STC by the STC forming circuit 57. On the basis of a comparison output, the reference time of the system is calibrated.

An output of the pack header extracting circuit 54 is supplied to a demultiplexer 58. The image data packet, the audio data packet, and the program packet are separated by the demultiplexer 58. The separation of the packets is executed by detecting the stream ID of the PES header.

The image data packet separated by the demultiplexer 58 is supplied to a PES header extracting circuit 61.

The PES header inserted in next 14 bytes of the pack header is extracted by the PES header extracting circuit 61. This PES header is supplied to a PES header analyzing circuit 62.

A stream ID, a scrambling control flag, a PTS, and the like are included in the PES header. Whether the contents has been encrypted or not can be discriminated from the scrambling control flag of the PES header. If the data has been encrypted AND WHEN the decryption of the encryption is permitted, a decryption key FOR the encryption is set into an encryption decrypting circuit 64.

The PTS included in the PES header is extracted by a PTS extracting circuit 65. The PTS shows a reproduction time. The extracted PTS is supplied to a reproduction timing setting circuit 66.

Further, in this example, the CD2 stream header is analyzed by the PES header analyzing circuit 62. An encode unit pointer, a stuffing ID, an edit ID, and the like have been recorded in the CD2 stream header.

An output of the PES header extracting circuit 61 is supplied to a packet decomposing circuit 63. The data of 2016 bytes of one packet is decomposed by the packet decomposing circuit 63.

An output of the packet decomposing circuit 63 is supplied to the encryption decrypting circuit 64. If the decryption of the contents data is permitted, the encryption decryption is executed by the encryption decrypting circuit 64. An output of the encryption decrypting circuit 64 is supplied to an image decoder 67.

The image decoder 67 executes a decompressing process of the image data on the basis of the compression encoding system of the image upon recording. That is, if the image data which is reproduced relates to an image of the JPEG system, the image decoder 67 executes a decoding process of JPEG. If it is motion image data of MPEG2, the image decoder 67 executes a decoding process of MPEG2.

The value of the PTS extracted by the PTS extracting circuit 65 is supplied to the reproduction timing setting circuit 66 and the reference time of the system is also supplied thereto from the STC forming circuit 57. The reproduction timing setting circuit 66 compares the time information shown by the PTS with the reference time of the system. The image data is decoded by the image decoder 67 at timing when the time information shown by the PTS and the reference time of the system coincide. The decoded image data is outputted from an output terminal 68.

The audio data packet separated by the demultiplexer 58 is supplied to a PES header extracting circuit 71.

The PES header inserted in next 14 bytes of the pack header is extracted by the PES header extracting circuit 71. This PES header is supplied to a PES header analyzing circuit 72.

A stream ID, a scrambling control flag, a PTS, and the like are included in the PES header. Whether the contents has been encrypted or not can be discriminated from the information of the PES header. If the data has been encrypted or if the decryption of the encryption is permitted, a decryption key of the encryption is set into an encryption decrypting circuit 74.

The PTS included in the PES header is extracted by a PTS extracting circuit 75. The PTS shows a reproduction time. The extracted PTS is supplied to a reproduction timing setting circuit 76.

Further, the CD2 stream header is analyzed by the PES header analyzing circuit 72. An encode unit pointer, a stuffing ID, an edit ID, and the like have been recorded in the CD2 stream header.

An output of the PES header extracting circuit 71 is supplied to a packet decomposing circuit 73. The data of 2016 bytes of one packet is decomposed by the packet decomposing circuit 73.

An output of the packet decomposing circuit 73 is supplied to the encryption decrypting circuit 74. If the decryption of the contents data is permitted, the decryption of the encryption is executed by the encryption decrypting circuit 74. An output of the encryption decrypting circuit 74 is supplied to an audio decoder 77.

The audio decoder 77 executes a decompressing process of the audio data on the basis of the compression encoding system of the audio upon recording. That is, if the audio data which is reproduced relates to ATRAC3, the audio decoder 77 executes a decoding process of ATRAC3. If it relates to MP3 or AAC, the audio decoder 77 executes a decoding process of MP3 or AAC.

The value of the PTS extracted by the PTS extracting circuit 75 is supplied to the reproduction timing setting circuit 76 and the reference clock of the system is also supplied thereto from the STC forming circuit 57. The reproduction timing setting circuit 76 compares the time information shown by the PTS with the reference time of the system. The audio data is decoded by the audio decoder 77 at timing when the time information shown by the PTS and the reference time of the system coincide. The decoded audio data is outputted from an output terminal 78.

In the above example, in the recording system, the multimedia data comprising the image data and the audio data is recorded onto the optical disc 1 in accordance with the specification of MPEG2-PS, and in the reproducing system, the multimedia data is reproduced. However, only the audio data can be also recorded/reproduced in accordance with the specification of MPEG2-PS. Naturally, only the image data can be also recorded/reproduced.

If only the audio data is recorded/reproduced, the system can be used as an audio recording/reproducing apparatus for recording/reproducing the audio data of ATRAC3 or MP3.

It is also possible to construct in a manner such that the still image data and the audio data are recorded, a script describing reproducing order of them is recorded, and the still image data and the audio data are reproduced in order designated by the script by the user.

As mentioned above, according to the embodiment of the invention, the contents data of the multiplexer media such as image data and audio data is compressed and recorded as one pack and one packet into one sector on the optical disc 1 of CD2 in accordance with MPEG2-PS.

Figure 4:
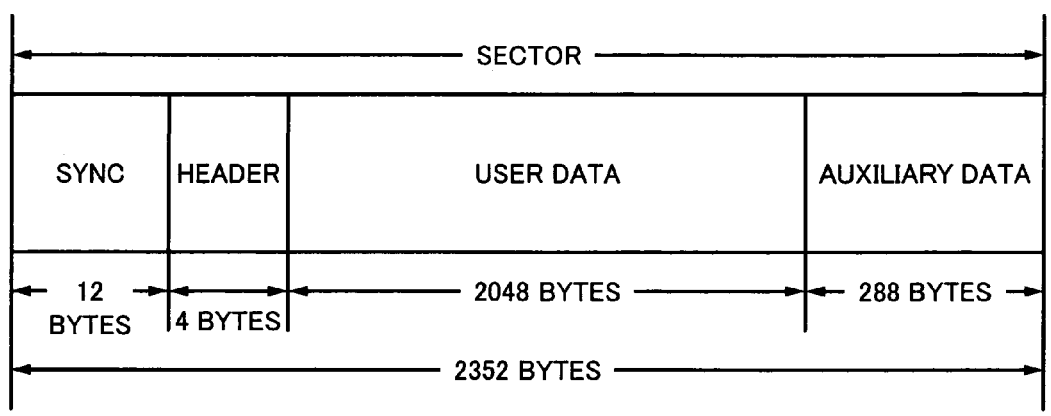
FIG. 4 is a schematic diagram for use in explanation of a data construction of a CD-ROM.

That is, FIG. 4 shows a construction of the data which is recorded in one sector. As mentioned above, one sector corresponds to one subcode block consisting of 98 frames of the CD. As shown in FIG. 4, the physical capacity of one sector is equal to 2352 bytes. In the case of CD-ROM Mode-1, auxiliary data of 288 bytes is added for error detection and correction. A sync of 12 bytes and a header of 4 bytes are provided at the head of each sector. Therefore, in the specification of CD-ROM Mode-1, the data recording capacity of one sector is equal to 2048 bytes.

Figure 5:
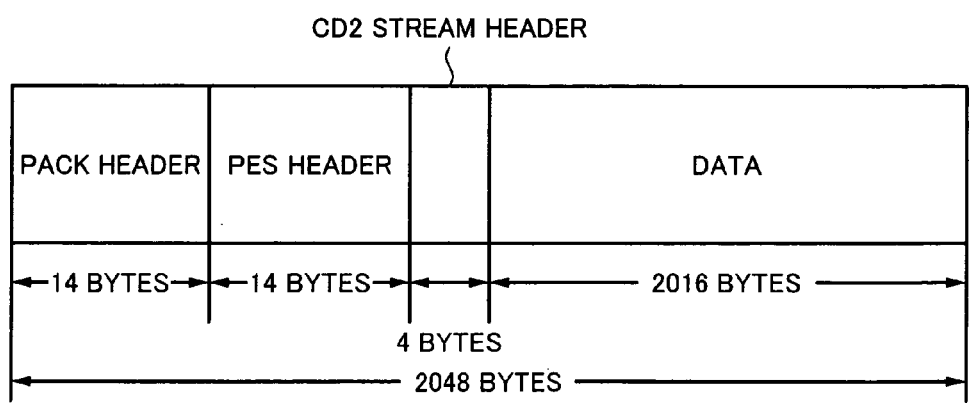
FIG. 5 is a schematic diagram for use in explanation in the case of recording data by MPEG2-PS.

FIG. 5 shows a construction of one pack of MPEG2-PS. As shown in FIG. 5, a pack header of 14 bytes is provided at the head of one pack. Subsequently, a PES header of 14 bytes is provided. Further, in the embodiment of the invention, a CD2 stream header of 4 bytes is provided. Data (payload) such as audio data, image data, etc. is arranged to subsequent 2016 bytes. A data amount of one pack and one packet is equal to 2048 bytes and coincides with the data recording capacity of one sector shown in FIG. 4.

In the specification of MPEG2-PS, stuffing bytes can be inserted into the pack header. However, in the embodiment of the invention, no stuffing byte is inserted into the pack header. In place of it, as will be explained hereinlater, the stuffing is executed by using the data area.

This is because a length of pack header is fixed, thereby enabling the start position of the packet data to be easily detected and enabling the scrambling control flag to be easily extracted.

That is, if the stuffing bytes are inserted into the pack header, the length of pack header becomes unstable, so that the start position of the data of one packet becomes unstable. On the contrary, if it is determined that no stuffing byte is inserted into the pack header, the pack header is fixed to 14 bytes, the PES header is fixed to 14 bytes, and the CD2 stream header is fixed to 4 bytes, respectively. The data of one packet is certainly started from the position of (14+14+4=32) from the head of one pack (or the head of one sector).

As will be explained hereinlater, the scrambling control flag (refer to FIG. 8) has been inserted into the PES header. In the case of controlling the scrambling upon reproduction, first, it is necessary to extract the scrambling control flag.

If it is determined that no stuffing byte is inserted into the pack header, the length of pack header is fixed to 14 bytes. If the length of pack header is fixed, by simply extracting the portion of a predetermined position from the head of one pack (or head of one sector), the scrambling control flag in the PES header can be extracted.

A padding packet can be provided according to the specification of MPEG2-PS. However, in the embodiment of the invention, no padding packet is used.

The reason why the padding packet is not used is because according to the padding packet, it is difficult to perform the padding of a small number of bytes or bits and if the padding packet is used, the PES header of the padding packet is encrypted or a problem occurs upon encryption.

That is, the PES packet is added to the padding packet and a packet start code of 32 bits and a packet length of 16 bits are described in the PES packet. Therefore, in order to insert the padding packet, it is necessary to certainly provide at least the PES header comprising the packet start code of 32 bits and the packet length of 16 bits. Data of less than 6 bytes corresponding to the PES header cannot be inserted.

Various information including the scrambling control flag has been stored in the PES header of the ordinary packet. However, the PES header of the padding packet comprises the packet start code of 32 bits and the packet length of 16 bits and various information cannot be stored. Therefore, the scrambling control flag cannot be inserted into the PES header of the padding packet. Thus, the control of the scrambling depends on the preceding PES packet. If the preceding PES packet has been encrypted, a case where the next padding packet including the PES header is encrypted can occur. If the PES header is encrypted, the start position and a length of the padding packet are unclear and there is a possibility that the correct decoding cannot be performed.

In the embodiment of the invention, therefore, as shown in FIG. 6, the stuffing is inserted into the data area of one packet. The stuffing data is usually set to all "1" or all "0". Since the stuffing data exists in the data area, if the stuffing is encrypted, it becomes data like random numbers. The stuffing is not limited to a fixed value but can be also executed by random numbers in consideration of the security. Information showing whether the stuffing has been inserted or not is described as a stuffing ID into the CD2 stream header and the stuffing length is described therein.

Figure 6A:
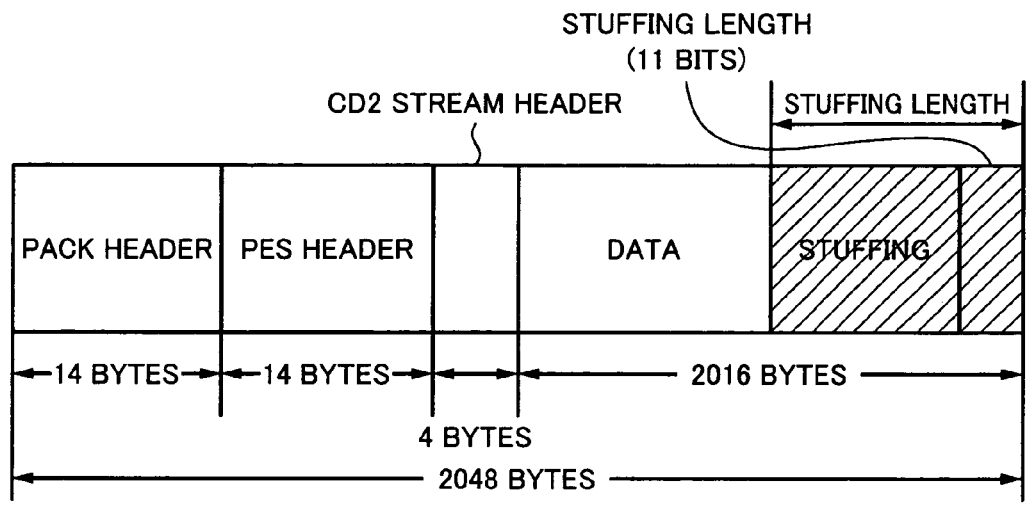
FIGS. 6A and 6B are schematic diagrams for use in explanation of stuffing.
Figure 6B:
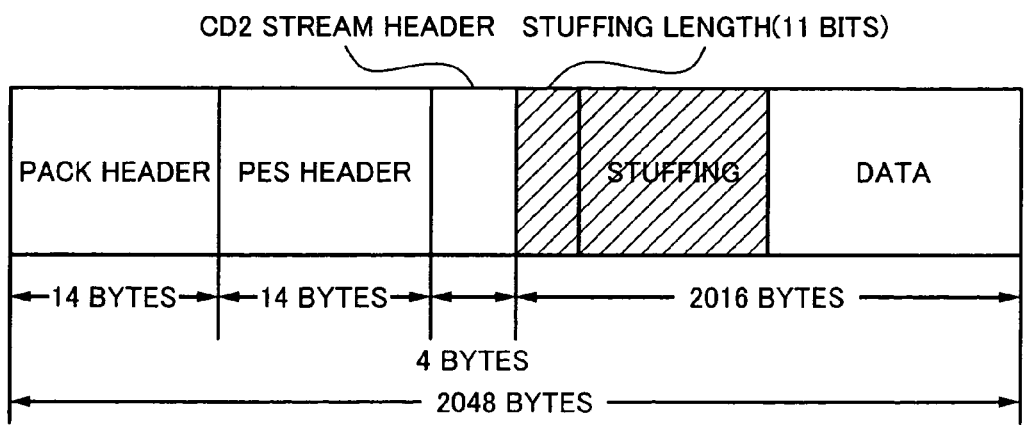

As a method of inserting the stuffing, there are a method of inserting the stuffing to a position after the data area as shown in FIG. 6A and a method of inserting the stuffing to a position before the data area as shown in FIG. 6B. If the stuffing is inserted to the position after the data area as shown in FIG. 6A, the stuffing length is described into the last, for example, 11 bits of the data. If the stuffing is inserted to the position before the data area as shown in FIG. 6B, the stuffing length is described into the beginning, for example, 11 bits of the data. In the case of performing the forward stuffing or the backward stuffing, whether the stuffing is the forward stuffing or the backward stuffing is discriminated by the stuffing ID.

Figure 7:
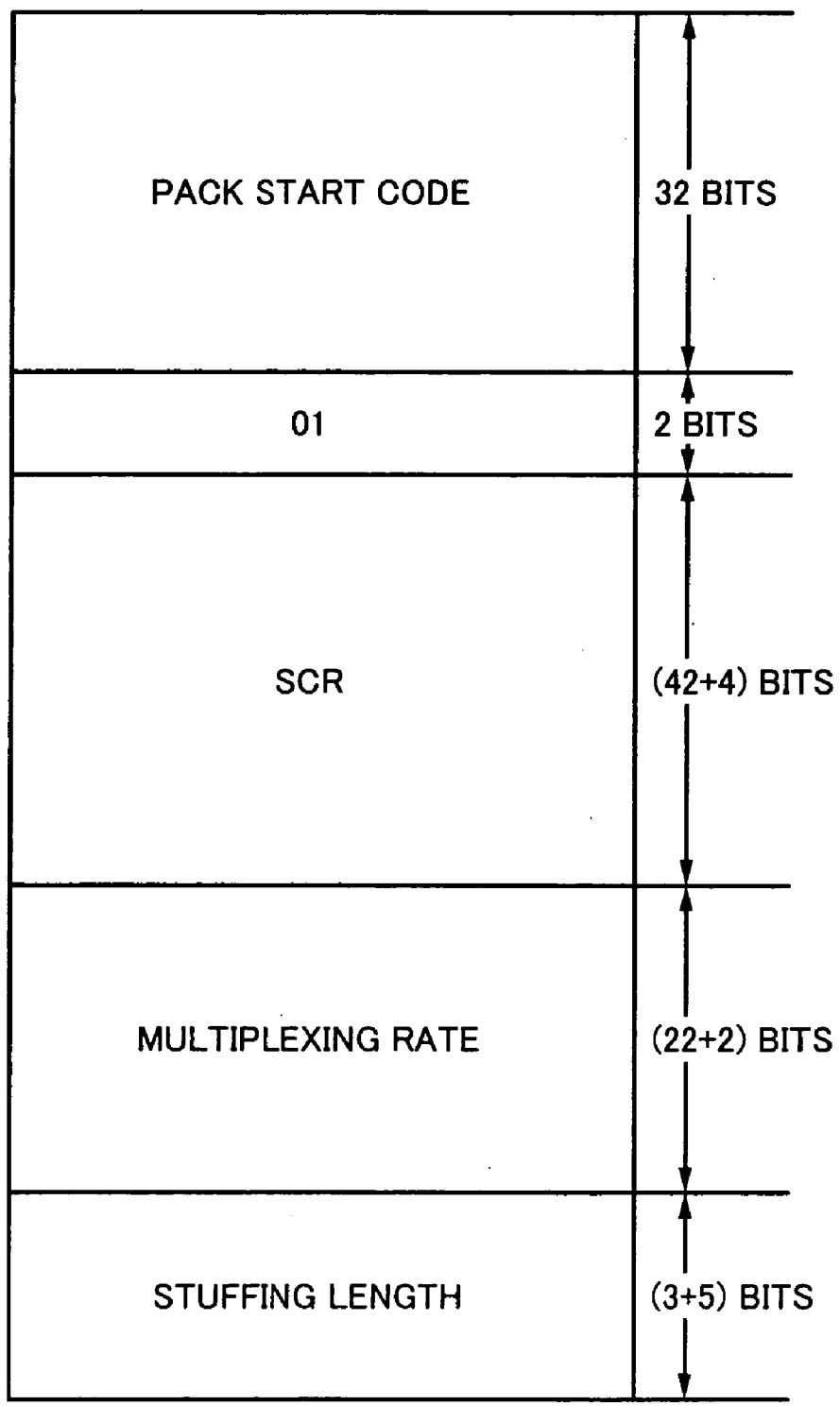
FIG. 7 is a schematic diagram for use in explanation of a pack header.

FIG. 7 shows a construction of the pack header provided at the head of one pack. As shown in FIG. 7, the pack header consists of 14 bytes and a pack start code (pack_start_code) of 32 bits is provided at the head of the pack header.

Subsequently, 2 bits "01" are provided and they are an identification code between MPEG1 and MPEG2.

After that, the SCR (42+4 bits) for calibrating the STC serving as a reference of the system and the multiplexing rate (program_mux_rate) (22+2 bits) are provided. The multiplexing rate is measured on a unit basis of 50 bytes/sec.

Further, the stuffing length (pack_stuffing_length) (3+5 bits) is provided. In MPEG2-PS, stuffing bytes (stuffing_bytes) shown by this stuffing length can be provided subsequently to the stuffing length. However, in the embodiment of the invention, it is determined that no stuffing is inserted there for the reasons as mentioned above. That is, the stuffing length is certainly set to "0".

Figure 8:
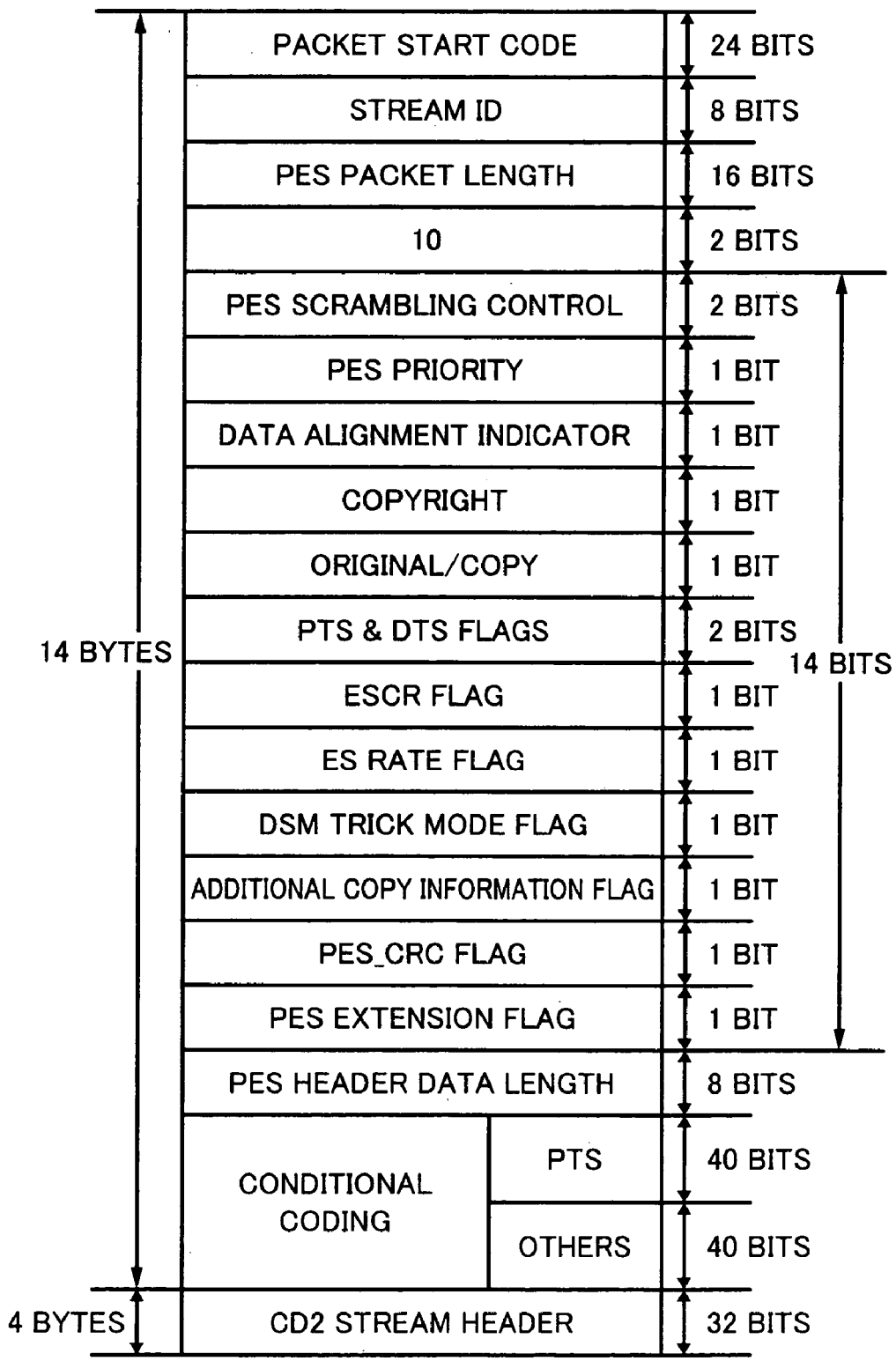
FIG. 8 is a schematic diagram for use in explanation of a packet header.

FIG. 8 shows a construction of the PES header. The PES header consists of 14 bytes and a packet start code (packet_start_code) of 24 bits is provided at the head of the PES header.

Subsequently, a stream ID (stream_id) of 8 bits is provided. By the stream ID, a kind of data, that is, whether the data is motion image data or audio data or the like can be identified.

Subsequently, a PES packet length (PES_packet_length) of 16 bits is provided. The PES packet length shows a data length of packet subsequent to this field.

Subsequently, various flags and control of 14 bits follow. As various flags and control, there are: a PES scrambling control (PES_scrambling_control) for controlling the scrambling of data; a PES priority (PES_priority) for distinguishing an important packet and other packets; a data alignment indicator (data_alignment_indicator); a copyright (copyright) indicative of the copyright of the contents data; an original/copy (original or copy) showing whether the contents data is an original or a copy; PTS & DTS flags (PTS_DTS_flags); an ESCR flag (ESCR_flag); an ES rate flag (ES_rate_flag); a DSM trick mode flag (DSM_trick_mode_flag); an additional copy information flag (additional_copy_info_flag); a PES_CRC flag (PES_CRC_flag); and a PES extension flag (PES_extention_flag).

Subsequently, a PES header length (PES_header_data_length) of 8 bits indicative of the length of PES header is provided.

Next 40 bits are conditional coding. In the case where the PTS is recorded here, the PTS of (3+7) bits is recorded.

In the case where the stream of MPEG2-PS has been recorded into CD2, a CD2 stream header of 4 bytes is provided subsequently to the PES header of 14 bytes.

Figure 9:
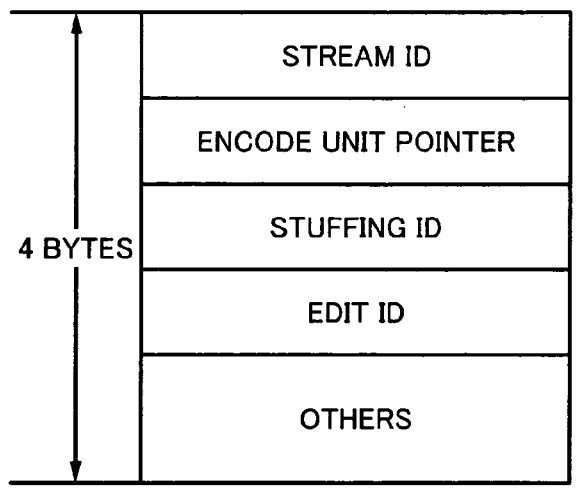
FIG. 9 is a schematic diagram for use in explanation of a CD2 stream header.

FIG. 9 shows a construction of the CD2 stream header. A stream ID, an encode unit pointer, a stuffing ID, and an edit ID are provided in the CD2 stream header.

The encode unit pointer shows a start position of the first complete encode unit in the sector.

That is, for example, a size of unit at the time when the audio data is encoded and a size of one packet are predetermined independently. Therefore, if the compressed audio data is filled into each packet, inconsistency of the head of the data of the packet and the head of the encode unit occurs. Therefore, if the user intends to access an arbitrary sector and start the reproduction in the fast-forward mode, fast-rewinding mode, or search mode, he loses the head of the encode unit and it is difficult to reproduce the data.

Therefore, the data up to the start position of the first complete encode unit in the sector is described as an encode unit pointer into the CD2 stream header. By using such an encode unit pointer, it is possible to access an arbitrary sector and easily reproduce the data from the head of the encode unit existing in this sector.

The stuffing ID is provided for identifying whether the stuffing exists in the data of the packet or not. As a stuffing, there are the backward stuffing as shown in FIG. 6A and the forward stuffing as shown in FIG. 6B. The stuffing ID identifies the presence or absence of the stuffing. If the stuffing has been executed, the stuffing ID identifies whether the stuffing is the forward stuffing or the backward stuffing.

The edit ID indicates the presence or absence of the edit point. If the edit point exists, the edit ID identifies where it is an end point or a start point.

In the embodiment of the invention as mentioned above, the contents data such as image data or audio data is compressed and recorded onto the optical disc 1 like CD2 in accordance with MPEG2-PS. As a compression system in the case of recording the audio data, use of ATRAC3, MP3, or AAC is considered.

As mentioned above, in ATRAC3, MP3, or AAC, the encoding is performed on a unit basis of a predetermined unit, and the size of encode unit and the size of one packet are predetermined independently. Therefore, if the compressed audio data is filled into each packet, a situation such that the head of the data of the packet and the head of the encode unit do not coincide occurs. Therefore, for example, if the user intends to access an arbitrary sector and start the reproduction in the search mode, he loses the head of the encode unit and it is difficult to smoothly reproduce the data.

According to the embodiment of the invention, therefore, the position of the complete encode unit of the sector is indicated by the encode unit pointer as mentioned above.

As shown in FIG. 9, the encode unit pointer is described in the CD2 stream header. By using such an encode unit pointer, when an arbitrary sector is accessed and the reproduction of the data is started, the head of the encode unit and the data can be smoothly reproduced as will be explained in detail hereinbelow.

It is now assumed that the audio data is compressed by ATRAC3 and recorded. In ATRAC, ATRAC2, or ATRAC3, the audio data in a time window is fetched, the audio data is band-divided, the data in a time area is converted into the data in a frequency area, and the audio data is compressed.

First, to clarify a concept of the encode unit, fundamental ATRAC will be explained prior to describing ATRAC3.

Figure 10:
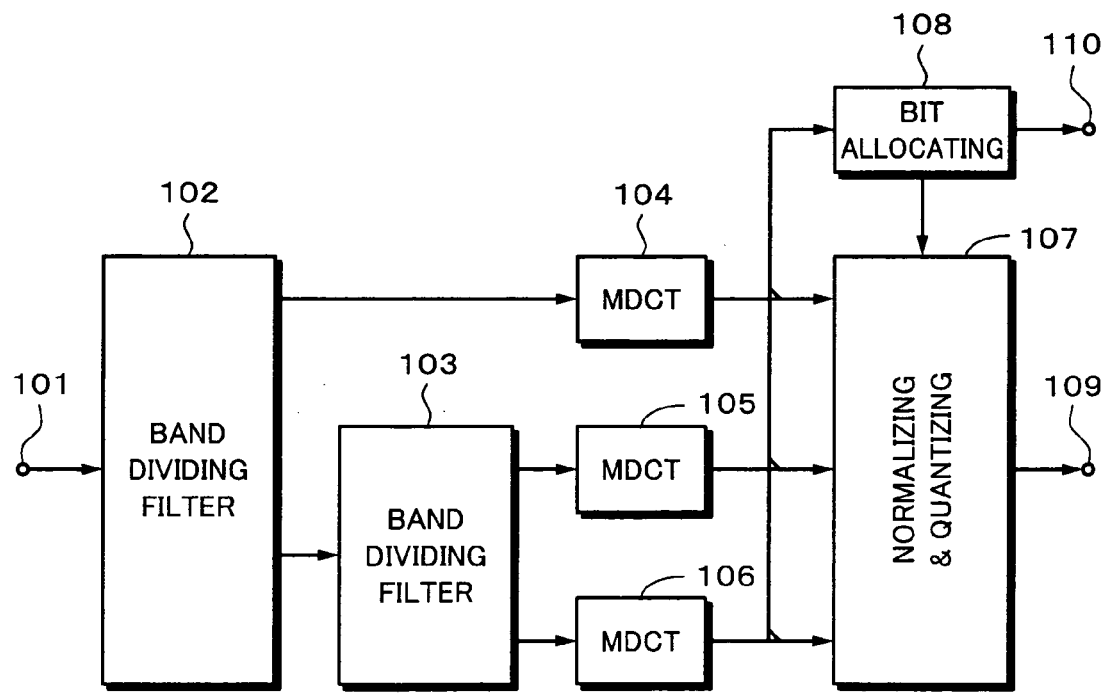
FIG. 10 is a block diagram showing a construction of an ATRAC encoder.

FIG. 10 shows an example of an ATRAC encoder. In FIG. 10, the audio data is sampled by, for example, 44.1 kHz, cut out by the time window of maximum 11.6 msec, and supplied to an input terminal 101. This audio data is supplied to a band dividing filter 102. In the band dividing filter 102, the input audio data is separated into a high band component and components of frequencies lower than that high band. The high band component separated by the band separating filter 102 is supplied to an MDCT (Modified DCT) transforming circuit 104 and the components of frequencies lower than that high band are supplied to a band separating filter 103. In the band separating filter 103, the input audio data is separated into a low band component and a middle band component. The separated middle band component is supplied to an MDCT circuit 105 and the low band component is supplied to an MDCT circuit 106.

As mentioned above, the audio data from the input terminal 101 is divided into three bands, that is, the high band, middle band, and low band by the band dividing filters 102 and 103 of two stages. QMFs (Quadrature Mirror Filters) are used as band dividing filters 101 and 102. The data of the high band component is supplied to the MDCT transforming circuit 104. The data of the middle band component is supplied to the MDCT transforming circuit 105. The data of the low band component is supplied to the MDCT circuit 106. In the MDCT transforming circuits 104, 105, and 106, the data of the high band component, the data of the middle band component, and the data of the low band component are converted from data in the time base area into spectrum data in the frequency area, respectively.

Outputs of the MDCT transforming circuits 104, 105, and 106 are supplied to a normalizing and quantizing circuit 107, respectively. In the normalizing and quantizing circuit 107, the outputs of the MDCT transforming circuits 104, 105, and 106 are quantized, respectively. An output of the normalizing and quantizing circuit 107 is outputted from an output terminal 109. The outputs of the MDCT transforming circuits 104, 105, and 106 are supplied to a bit allocating circuit 108. Bit allocation of the normalizing and quantizing circuit 107 is determined by the bit allocating circuit 108 in accordance with an amount of codes. This bit allocation information is outputted from an output terminal 110.

Figure 11:
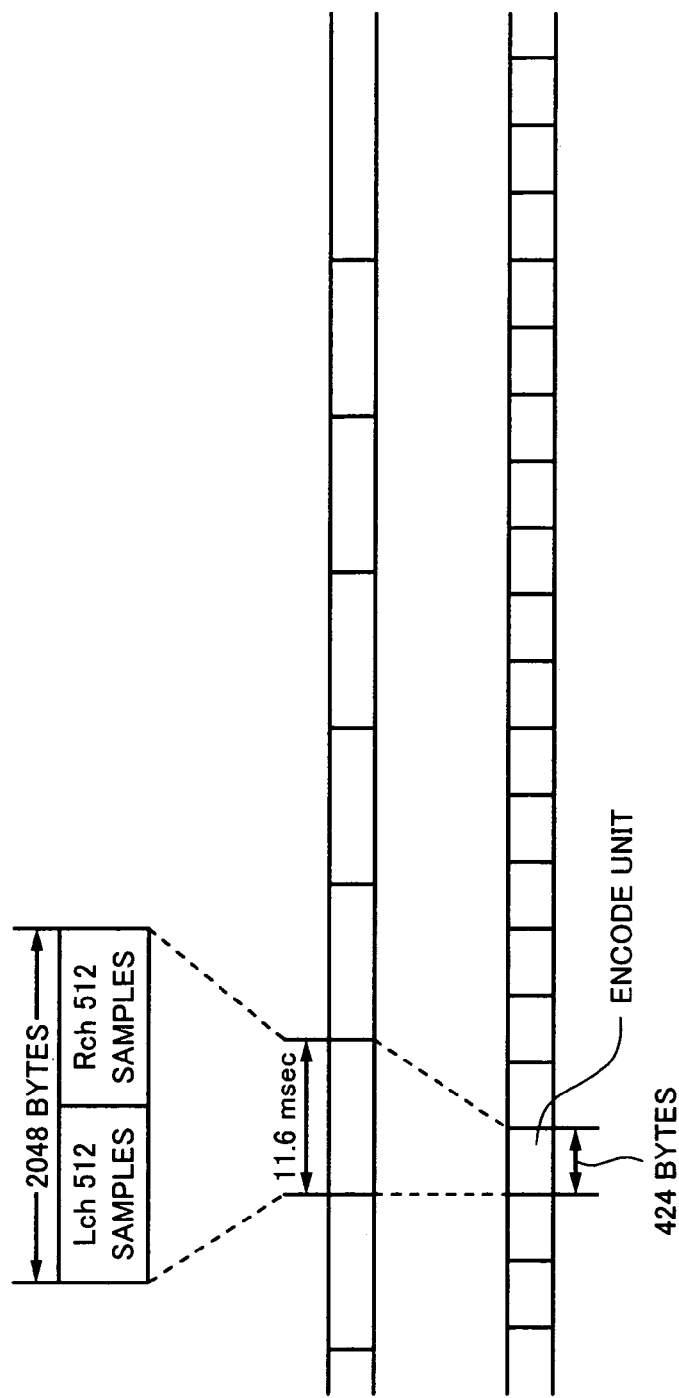
FIGS. 11A and 11B are schematic diagrams for use in explanation of the ATRAC encoder.

FIG. 11 is a diagram for explaining the compressing process in an ATRAC encoder. As shown in FIG. 1A, the input audio data is cut out by the time window of maximum 11.6 msec. Actually, the time window is opened separately in a short mode and a long mode. An overlap is included in the time window.

Since the sampling frequency of the audio data is equal to 44.1 kHz, the time window of 11.6 msec corresponds to 512 samples. Since one sample consists of 16 bits, the data of 512 samples in the two right and left channels corresponds to $$512 \times 2 \times 16/8 = 2048 \text{ bytes}$$

This data is separated into three frequency components of the high band, middle band, and low band as mentioned above, transformed into the spectrum data in the frequency areas by the MDCT transformation, and normalized and quantized. Thus, as shown in FIG. 11B, the data of 2048 bytes is compressed into about ⅕ and becomes 424 bytes. The data of 424 bytes is set to an encode unit at the time when the audio data is compressed. In ATRAC, such an encode unit is called a sound group. In this example, the sound group comprising 424 bytes serving as an encode unit is set to the encode unit.

Figure 12:
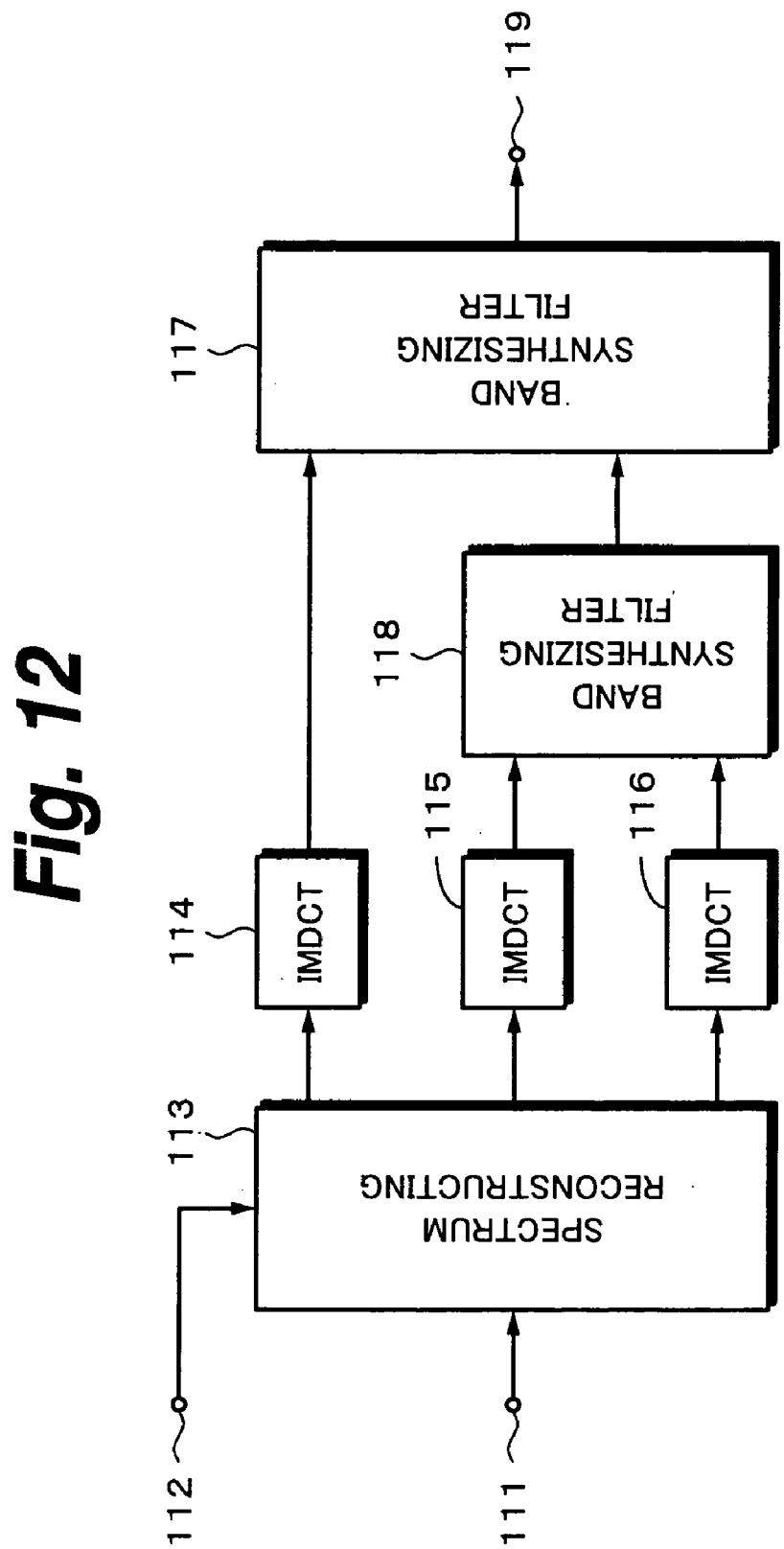
FIG. 12 is a block diagram showing a construction of an ATRAC decoder.

FIG. 12 shows a construction of an ATRAC decoder. In FIG. 12, the data compressed by ATRAC is supplied to an input terminal 111. The bit allocation information is supplied from an input terminal 112.

In a spectrum reconstructing circuit 113, an inverse quantization is executed on the basis of the bit allocation information and the spectrum data is reconstructed. The spectrum data of the high band component, the spectrum data of the middle band, and the spectrum data of the low band are outputted from the spectrum reconstructing circuit 113. The spectrum data of the high band component is supplied to an IMDCT transforming circuit 114. The spectrum data of the middle band component is supplied to an IMDCT transforming circuit 115. The spectrum data of the low band component is supplied to an IMDCT transforming circuit 116. In the IMDCT transforming circuits 114, 115, and 116, the spectrum data in the frequency area is transformed into the data in the time area.

An output of the IMDCT transforming circuit 114 is supplied to a band synthesizing filter 117. Outputs of the IMDCT transforming circuits 115 and 116 are supplied to a band synthesizing filter 118. In the band synthesizing filter 118, the data of the middle band component and the data of the low band component are synthesized. In the band synthesizing filter 117, the data of the high band component is further synthesized to the data of the middle band component and the data of the low band component synthesized by the band synthesizing filter 118. An output of the band synthesizing filter 117 is outputted from an output terminal 119.

FIG. 13 is a diagram for explaining the decompressing process of the ATRAC decoder. As shown in FIG. 13A, the spectrum data of the encode unit of 424 bytes is transformed into the data in the time area by the IMDCT transformation, band-synthesized, and returned to the original audio data. Thus, the data of one encode unit of 424 bytes becomes the data of 2048 bytes. As shown in FIG. 13B, the data of 2048 bytes corresponds to the data of 512 samples of the two right and left channels of 11.6 msec. As mentioned above, in ATRAC, the data of 2048 bytes in the right and left channels corresponding to 11.6 sec is encoded every encode unit of 424 bytes.

ATRAC2 enables ATRAC to further cope with a low bit rate and a tone-like component is separated and encoded. In ATRAC3, a slight modification is further performed.

FIG. 14 shows an example of an ATRAC3 encoder. In FIG. 14, for example, the audio data cut out by the time window of, for example, maximum 11.6 msec is supplied from an input terminal 121 to a band dividing filter 122. The audio data is divided into components of four bands by the band dividing filter 122. The data of each band is further decimated to a rate of ¼ by the band dividing filter 122 and supplied to gain control circuits 123, 124, 125, and 126, respectively. By the gain control circuits 123, 124, 125, and 126, gain control is made to the data of each band by a function which has adaptively been predetermined.

Outputs of the gain control circuits 123, 124, 125, and 126 are supplied to MDCT transforming circuits 127, 128, 129, and 130, respectively. The data in the time area is transformed into the spectrum data in the frequency area by the MDCT transforming circuits 127, 128, 129, and 130, respectively. 256 coefficient data are obtained from each of the MDCT transforming circuits 127, 128, 129, and 130, so that 1024 coefficient data are obtained as a total of four bands.

Outputs of the MDCT transforming circuits 127, 128, 129, and 130 are supplied to a spectrum data separating circuit 131.

Those outputs are separated into a tone component and a non-tone component by the spectrum data separating circuit 131. The tone component is supplied to a tone component encoder 132 and the non-tone component is supplied to a non-tone component encoder 133. By the tone component encoder 132 and the non-tone component encoder 133, the normalization and quantization are executed separately with respect to the tone component and the non-tone component, respectively. An output of the tone component encoder 132 and an output of the non-tone component encoder 133 are supplied to a code train forming circuit 134. A code train is formed by the code train forming circuit 134. Entropy encoding is also used for generation of the code train. An output of the code train forming circuit 134 is outputted from an output terminal 135.

FIG. 15 shows an example of an ATRAC3 decoder. In FIG. 15, the data compressed by ATRAC3 is supplied from an input terminal 141 to a code train decomposing circuit 142. The spectrum data in the frequency area is decomposed by the code train decomposing circuit 142 separately with respect to the tone component and the non-tone component. The tone component is supplied to a tone component decoder 143. The non-tone component data is supplied to a non-tone component decoder 144. An inverse quantization of the coefficient data of the tone component is executed in the tone component decoder 143. An inverse quantization of the coefficient data of the non-tone component is executed in the non-tone component decoder 144.

An output of the tone component decoder 143 and an output of the non-tone component decoder 144 are supplied to a spectrum data synthesizing circuit 145. The spectrum data of the tone component and the spectrum data of the non-tone component are synthesized by the spectrum data synthesizing circuit 145.

An output of the spectrum data synthesizing circuit 145 is supplied to IMDCT circuits 146, 147, 148, and 149. The spectrum data is returned to the data in the time area by the IMDCT circuits 146, 147, 148, and 149, respectively.

Outputs of the IMDCT circuits 146, 147, 148, and 149 are supplied to gain compensating circuits 150, 151, 152, and 153, respectively. The gain compensating circuits 150, 151, 152, and 153 are provided in correspondence to the gain control circuits 123, 124, 125, and 126 on the encoder side. Outputs of the gain compensating circuits 150, 151, 152, and 153 are supplied to a band synthesizing filter 154. The data of each band is synthesized by the band synthesizing filter 154. An output of the band synthesizing filter 154 is fetched from an output terminal 155. The decompressed original audio data is derived from the output terminal 155.

In ATRAC3, the adaptive bit allocation is performed and since the bit allocation information is included in the code train, it is possible to arbitrarily cope with a bit rate. As a transmission bit rate, 66 kbps, 105 kbps, 132 kbps, or the like is used.

Assuming that ATRAC3 is used as a compression system of the audio data as mentioned above, as shown in FIG. 16, when the transmission rate is equal to 66 kbps, a size of encode unit is equal to 192 bytes (FIG. 16A). When the transmission rate is equal to 105 kbps, a size of encode unit is equal to 304 bytes (FIG. 16B). When the transmission rate is equal to 132 kbps, a size of encode unit is equal to 384 bytes (FIG. 16C).

As mentioned above, if the user intends to record in accordance with CD-ROM Mode-1, as shown in FIG. 4, the recording is executed on a sector unit basis. The size of one sector is equal to 2352 bytes. In the case of CD-ROM Mode-1, the data recording capacity of one sector is equal to 2048 bytes.

As shown in FIG. 5, in the case of recording the data in accordance with MPEG2-PS, since the pack header of 14 bytes and the PES header of 14 bytes are added and the CD2 stream header of 4 bytes is further added, a data amount of the packet data of one sector is equal to 2016 bytes.

On the other hand, as shown in FIG. 16, assuming that ATRAC3 is used as a compression system of the audio data, when the transmission rate is equal to 66 kbps, a size of encode unit is equal to 192 bytes. When the transmission rate is equal to 105 kbps, a size of encode unit is equal to 304 bytes. When the transmission rate is equal to 132 kbps, a size of encode unit is equal to 384 bytes. Since the size of packet data of one sector and the size of encode unit have been independently predetermined, if a plurality of encode units are stored into one packet, a remainder occurs.

That is, as shown in FIG. 17, when the transmission rate is equal to 66 kbps, ten encode units each consisting of 192 bytes are stored for the data capacity of the packet of one sector and 96 bytes remain. When the transmission rate is equal to 105 kbps, six encode units each consisting of 304 bytes are stored for the data capacity of one sector and 192 bytes remain. When the transmission rate is equal to 132 kbps, five encode units each consisting of 384 bytes are stored for the data capacity of one sector and 96 bytes remain.

In the CD, the data is accessed on a sector unit basis. Therefore, if the head of the packet data of one sector and the head of the encode unit do not coincide, when the data is accessed on a sector unit basis, the decoding cannot be performed from the head of the encode unit and the smooth decoding cannot be performed.

If the user intends to always allow the head of the packet data of one sector and the head of the encode unit to coincide, a waste occurs in the data recording capacity. That is, for example, when the transmission rate is equal to 66 kbps, 96 bytes per sector becomes wasteful.

Therefore, in the embodiment of the invention, the encode units are stuffed and recorded and the position of the complete encode unit existing at the head of the sector is shown by the pointer.

For example, when the transmission rate is equal to 66 kbps, as shown in FIG. 17, ten encode units SU(1) to SU(10) are stored in a sector (1) and an encode unit SU(11) are recorded over the sector (1) and a sector (2). The encode unit SU(11) is recorded in the sector (2) from the middle of it. In this case, in the sector (2), a length in a range from the head of the packet data of the sector to the head of an encode unit SU(12) serving as a complete encode unit $$2113-2017=96 \text{ bytes}$$

is recorded as an encode unit pointer.

When the transmission rate is equal to 105 kbps, as shown in FIG. 17, six encode units SU(1) to SU(6) are stored in the sector (1) and the encode unit SU(7) is recorded over the sector (1) and the sector (2). The encode unit SU(7) is recorded in the sector (2) from the middle of it. In this case, in the sector (2), a length in a range from the head of the packet data of the sector to the head of the encode unit SU(8) serving as a complete encode unit $$2129-2017=112 \text{ bytes}$$

is recorded as an encode unit pointer.

When the transmission rate is equal to 132 kbps, as shown in FIG. 17, five encode units SU(1) to SU(5) are stored in the sector (1) and the encode unit SU(6) is recorded over the sector (1) and the sector (2). The encode unit SU(6) is recorded in the sector (2) from the middle of it. In this case, in the sector (2), a length in a range from the head of the packet data of the sector to the head of the encode unit SU(7) serving as a complete encode unit $$2305-2017=288 \text{ bytes}$$

is recorded as an encode unit pointer.

As mentioned above, if the length in a range from the head of the packet data of the sector to the head of the encode unit serving as a complete encode unit is recorded as an encode unit pointer, when the sector is accessed, the position of the encode unit serving as a complete encode unit from the head of the sector can be known from a value of the encode unit pointer, so that the decoding can be immediately started from the head of the encode unit.

The length up to the head of the complete encode unit can be specified by the sector number if the encode unit is predetermined as a fixed length.

At this time, for example, in the case of ATRAC3, if a sector number is allocated by setting 8 sectors (16 kbytes) to a group of management units, the encode unit pointers can be easily managed.

That is, the encode units in ATRAC3 are stuffed from the first sector and the sector numbers are sequentially allocated to the sectors (1) to (8). After the numbers are allocated, the allocating position is returned to the sector (1) and the sector numbers are allocated.

By using the above method, if the bit rate is equal to 66 kbps, as shown in FIG. 18, the encode units (1), (2), . . . are arranged to the sectors (1), (2), . . . and the encode unit pointers of the sectors (1), (2), . . . are as shown in FIG. 19.

That is, as shown in FIG. 19, if the bit rate is equal to 66 kbps, when the sector number is equal to "1", the encode unit pointer is equal to "0"; when the sector number is equal to "2", the encode unit pointer is equal to "96"; when the sector number is equal to "3", the encode unit pointer is equal to "0"; when the sector number is equal to "4", the encode unit pointer is equal to "96"; when the sector number is equal to "5", the encode unit pointer is equal to "0"; when the sector number is equal to "6", the encode unit pointer is equal to "96"; when the sector number is equal to "7", the encode unit pointer is equal to "0"; and when the sector number is equal to "8", the encode unit pointer is equal to "96".

If the bit rate is equal to 105 kbps, as shown in FIG. 20, the encode units (1), (2), . . . are arranged to the sectors (1), (2), . . . and the encode unit pointers of the sectors (1), (2), . . . are as shown in FIG. 21.

That is, as shown in FIG. 21, if the bit rate is equal to 105 kbps, when the sector number is equal to "1", the encode unit pointer is equal to "0"; when the sector number is equal to "2", the encode unit pointer is equal to "112"; when the sector number is equal to "3", the encode unit pointer is equal to "224"; when the sector number is equal to "4", the encode unit pointer is equal to "32"; when the sector number is equal to "5", the encode unit pointer is equal to "144"; when the sector number is equal to "6", the encode unit pointer is equal to "256"; when the sector number is equal to "7", the encode unit pointer is equal to "64"; and when the sector number is equal to "8", the encode unit pointer is equal to "176".

A data capacity corresponding to 8 sectors is equal to

2016×8=16128 bytes

Assuming that 53 encode units are recorded here over 8 sectors, a data capacity is equal to 304×53=16112 bytes Therefore, by performing the stuffing of 16128−16112=16 bits the head of the encode unit in the next sector coincides with the head of the packet data of the sector.

If the bit rate is equal to 132 kbps, as shown in FIG. 22, the encode units (1), . . . are arranged to the sectors (1), (2), . . . and the encode unit pointers of the sectors (1), (2), . . . are as shown in FIG. 23.

That is, as shown in FIG. 23, if the bit rate is equal to 105 kbps, when the sector number is equal to "1", the encode unit pointer is equal to "0"; when the sector number is equal to "2", the encode unit pointer is equal to "288"; when the sector number is equal to "3", the encode unit pointer is equal to "192"; when the sector number is equal to "4", the encode unit pointer is equal to "96"; when the sector number is equal to "5", the encode unit pointer is equal to "0"; when the sector number is equal to "6", the encode unit pointer is equal to "288"; when the sector number is equal to "7", the encode unit pointer is equal to "192"; and when the sector number is equal to "8", the encode unit pointer is equal to "96".

As mentioned above, for example, in the case of ATRAC3, when the sector numbers are allocated by setting the group of 8 sectors to a management unit, if the bit rate has been predetermined, the encode unit pointers can be managed by the eight sector numbers (1) to (8).

Therefore, for example, in the case of ATRAC3, the sector numbers in the management units of the group of 8 sectors can be also described in place of the encode unit pointers of the CD2 stream header. The encoding system, bit rate, or the like can be also described.

As a CD2 stream header in which the encode unit pointers can be specified from the sector numbers, the following construction has been examined. The CD2 stream header consists of 4 bytes (32 bits). As shown below, the CD2 stream header of 4 bytes is constructed by: a stream ID; a stuffing ID; a sampling frequency; a channel construction; a fixed length/variable length encoding; an inter-channel encoding; a bit rate; a sector number; and reserve. Those component elements show the following contents.

(1) Stream ID (6 bits):
  Shows the kind of stream such as AAC, MP3, ATRAC3, or the like.
(2) Stuffing ID (2 bits):
  Shows no stuffing, stuffing of 1 byte, or stuffing of 2 or more bytes.
(3) Sampling frequency (5 bits):
  Shows the sampling frequency such as 22.05 kHz, 44.1 kHz, 88.2 kHz, 176.4 kHz, 16 kHz, 32 kHz, 48 kHz, 96 kHz, 192 kHz, etc.
(4) Channel construction (3 bits):
  Shows a channel construction such as monaural, 2-channel stereophonic, 4-channel stereophonic, 5.1-channel stereophonic, 6-channel stereophonic, 7.1-channel stereophonic, etc.
(5) Fixed length/variable length encoding (1 bit)
  Shows whether the data has been encoded by a fixed length or a variable length.
(6) Inter-channel encoding (1 bit):
  Shows LR independent encoding or joint encoding.
(7) Bit rate (3 bits):
  Shows whether the bit rate is equal to 66 kbps, 105 kbps, or 132 kbps.
(8) Sector Number (3 bits):
  Shows the sector numbers 1 to 8 in the group.
(9) Reserve (8 bits):
  Reserved for future extension.

The encode unit pointer is specified by the bit rate and the stream ID as mentioned above.

Although the above example has been described with respect to the case of compressing and recording the audio data by ATRAC3, similar processes are also executed in the case of recording by MP3 or AAC.

Figure 24:
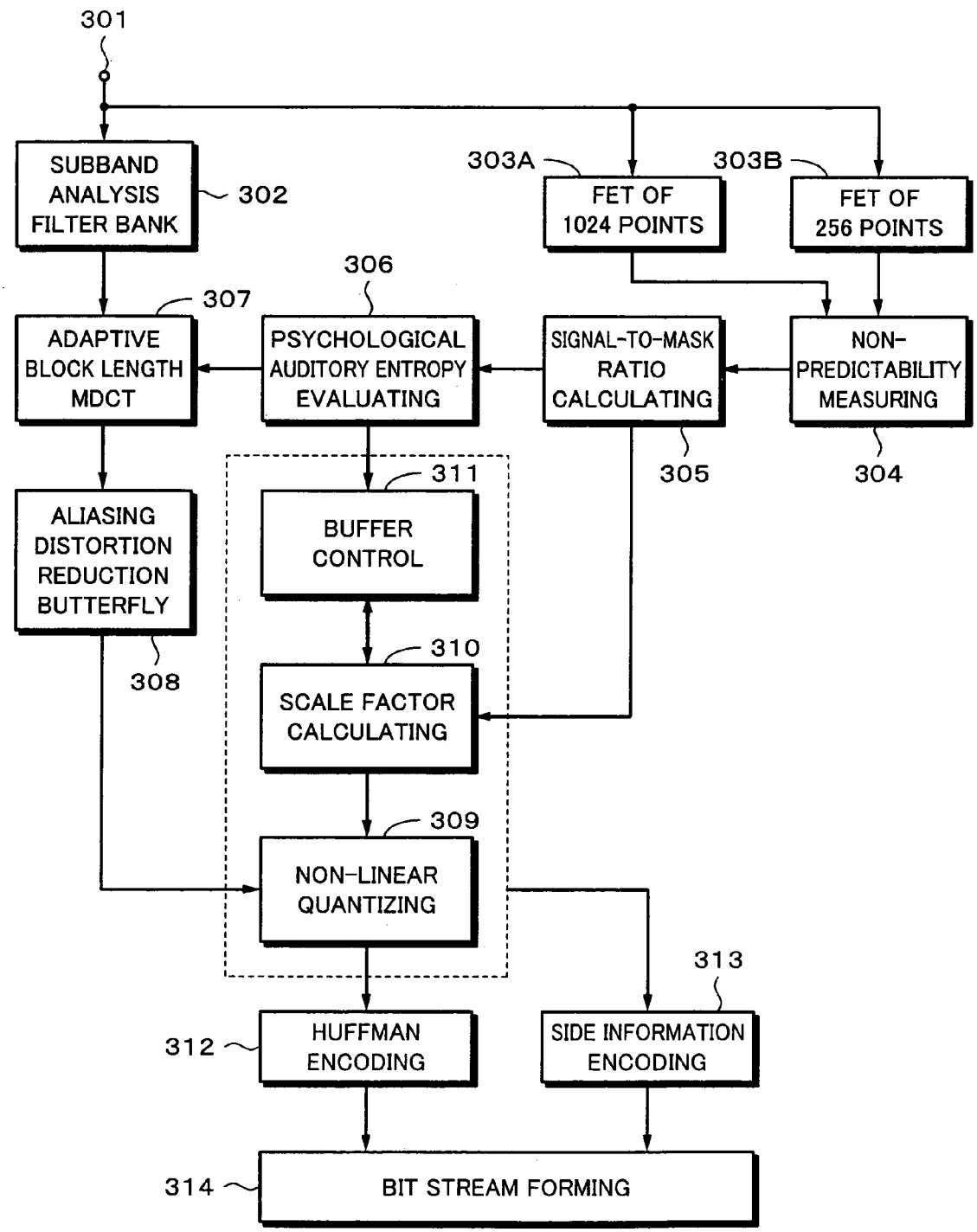
FIG. 24 is a block diagram showing a construction of an MP3 encoder.

FIG. 24 shows a construction of an MP3 encoder. In FIG. 24, a stream of the audio data is supplied to an input terminal 301. This audio stream is supplied to a subband analysis filter bank 302. The subband analysis filter bank 302 comprises a polyphase filter and divides an audio signal into 32 subbands of an equal width frequency.

The stream of the input audio data is supplied to FFTs 303A and 303B. Outputs of the FFTs 303A and 303B are sent to a non-predictability measuring unit 304. An output of the non-predictability measuring unit 304 is supplied to a signal-to-mask ratio calculating unit 305. An output of the signal-to-mask ratio calculating unit 305 is supplied to a psychological auditory entropy evaluating unit 306.

The FFTs 303A and 303B, non-predictability measuring unit 304, signal-to-mask ratio calculating unit 305, and psychological auditory entropy evaluating unit 306 form a psychological auditory model for deciding a ratio of a signal energy to a masking threshold of each subband. The psychological auditory model analyzes the audio signal and calculates a masking amount of noises which can be used as a function of a frequency. In this instance, at the same time, a block length of MDCT is determined on the basis of a psychological auditory entropy using predictability.

An output of the subband analysis filter bank 302 is supplied to an adaptive block length MDCT arithmetic operating unit 307. The adaptive block length MDCT arithmetic operating unit 307 executes an MDCT arithmetic operation to the audio data of each subband. In the adaptive block length arithmetic, operating unit 307, two kinds of MDCT block lengths of a long block of 18 samples and a short block of 6 samples are used. Frequency resolution of the audio signal having stationary characteristics is improved by the long block. Frequency resolution of the temporary signal is improved by the short block. In the short block mode, one long block is replaced with three short blocks.

An output of the adaptive block length arithmetic operating unit 307 is supplied to an aliasing distortion reduction butterfly unit 308. In the aliasing distortion reduction butterfly unit 308, 8 samples near a band boundary are inputted for 32 bands of a filter bank and an aliasing distortion removing process is executed in a butterfly frequency area to the data obtained by the MDCT arithmetic operation. That is, a butterfly arithmetic operation is executed to the bands of the adjacent polyphase filter banks. An output of the aliasing distortion reduction butterfly unit 308 is supplied to a non-linear quantizing unit 309.

An output of a scale factor calculating unit 310 is supplied to the non-linear quantizing unit 309. On the basis of information from the psychological auditory model, the scale factor calculating unit 310 determines the number of codebits which are allocated to the subbands. An output of a scale factor calculating unit 310 is supplied to a buffer control unit 311.

Data quantized by the non-linear quantizing unit 309 is sent to a Huffman encoding unit 312. In the Huffman encoding unit 312, variable; length encoding is executed by a Huffman code. The data encoded as mentioned above is sent to a bit stream forming unit 314 together with side information such as bit allocation information from a side information encoding unit 313. In the bit stream forming unit 314, frame headers are added to the Huffman encoded data and the side information and this data is assembled into the frame.

Figure 25:
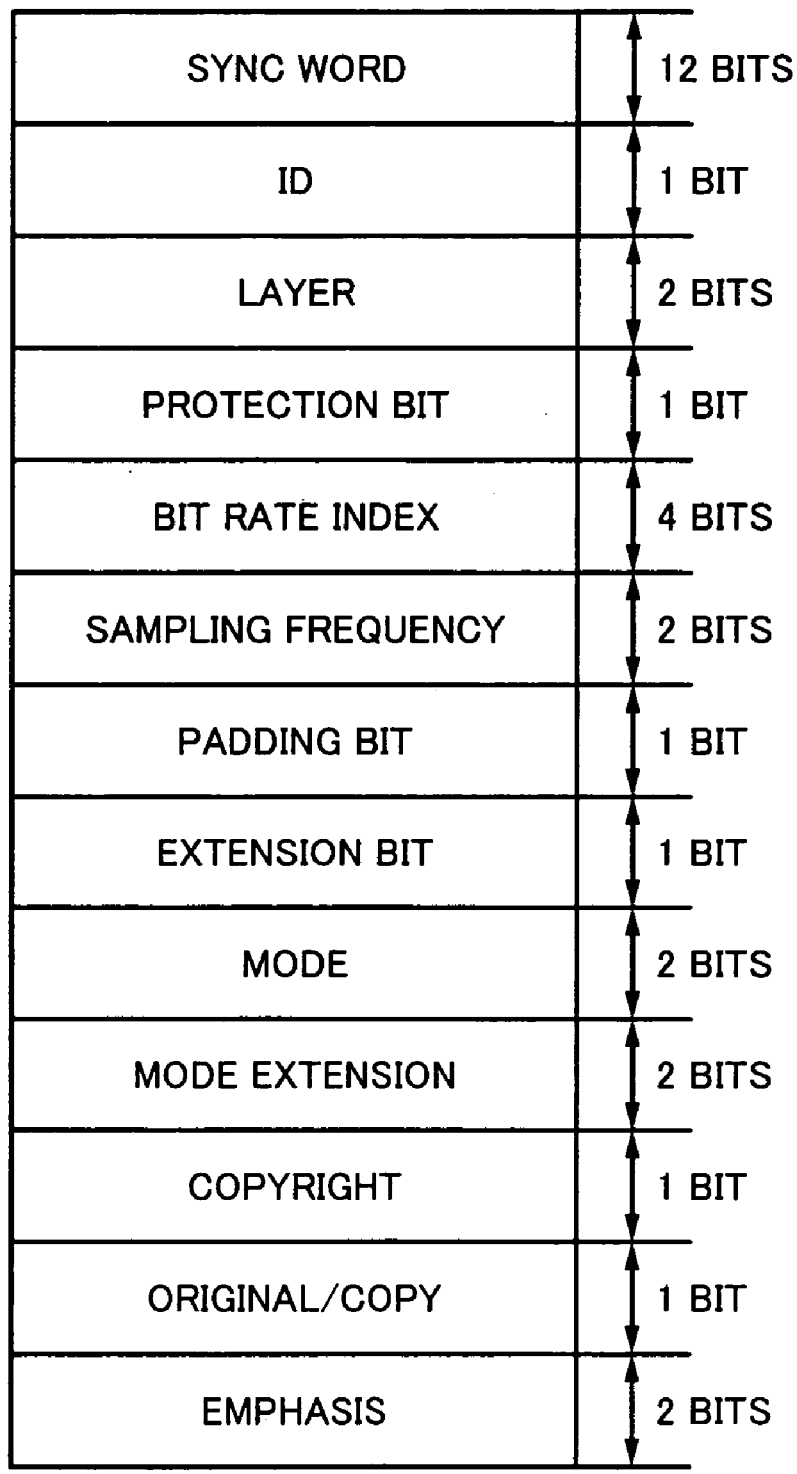
FIG. 25 is a schematic diagram for use in explanation of a frame header of MP3.

As shown in FIG. 25, subsequently to the header, the encoded audio data and a CRC are added to data of MP3.

FIG. 25 shows a frame header in the case of MP3. As shown in FIG. 25, a sync word of a predetermined pattern of 12 bits is provided at the head.

Subsequently, an ID is provided. If the ID word is equal to "1", it indicates MPEG1.

Subsequent to the ID, a Layer of 2 bits is provided. In this Layer, "00" indicates Layer-1, "11" indicates Layer-2, and "10" indicates Layer-3.

Subsequently, a protection bit of 1 bit is provided. The protection bit shows whether error detection correction information has been added or not. When it is equal to "0", the error detection correction information has been added. When it is equal to "1", the error detection correction information is not added.

Subsequently, a bit rate index of 4 bits is provided. The bit rate index defines a bit rate.

Subsequently, a sampling frequency is provided. When sampling frequency information is equal to "00", the sampling frequency is equal to 44.1 kHz. When it is equal to "01", the sampling frequency is equal to 48 kHz. When it is equal to "10", the sampling frequency is equal to 32 kHz.

Subsequently, a padding bit of 1 bit is provided. If the padding bit has been embedded, the padding bit is set to "1". If the padding bit is not embedded, the padding bit is set to "0".

Subsequently, an extension bit of 1 bit is provided. This extension bit is a personal identification flag.

Subsequently, a mode of 2 bits is provided. This mode defines an audio channel. "00" indicates stereophonic, "01" indicates joint stereophonic, "10" indicates dual channels, and "11" indicates monaural.

Subsequently, a mode extension of 2 bits is provided. In Layer-1 or Layer-2, upon joint stereophonic coding, it is set for the frequency band. Layer-3 indicates a combination of intensity stereophonic and MS stereophonic which were used.

Subsequently, a copyright of 1 bit is provided. It indicates whether data is a copyright matter or not. In the case of the copyright matter, this bit is set to "1". If it is not the copyright matter, this bit is set to "0".

Subsequently, original/copy of 1 bit is provided. In the case of the original, it is set to "1". In the case of the copy, it is set to "0".

Subsequently, emphasis of 2 bits are provided. It indicates the presence or absence of the emphasis. If the emphasis is used, a kind of emphasis is shown.

Figure 26:
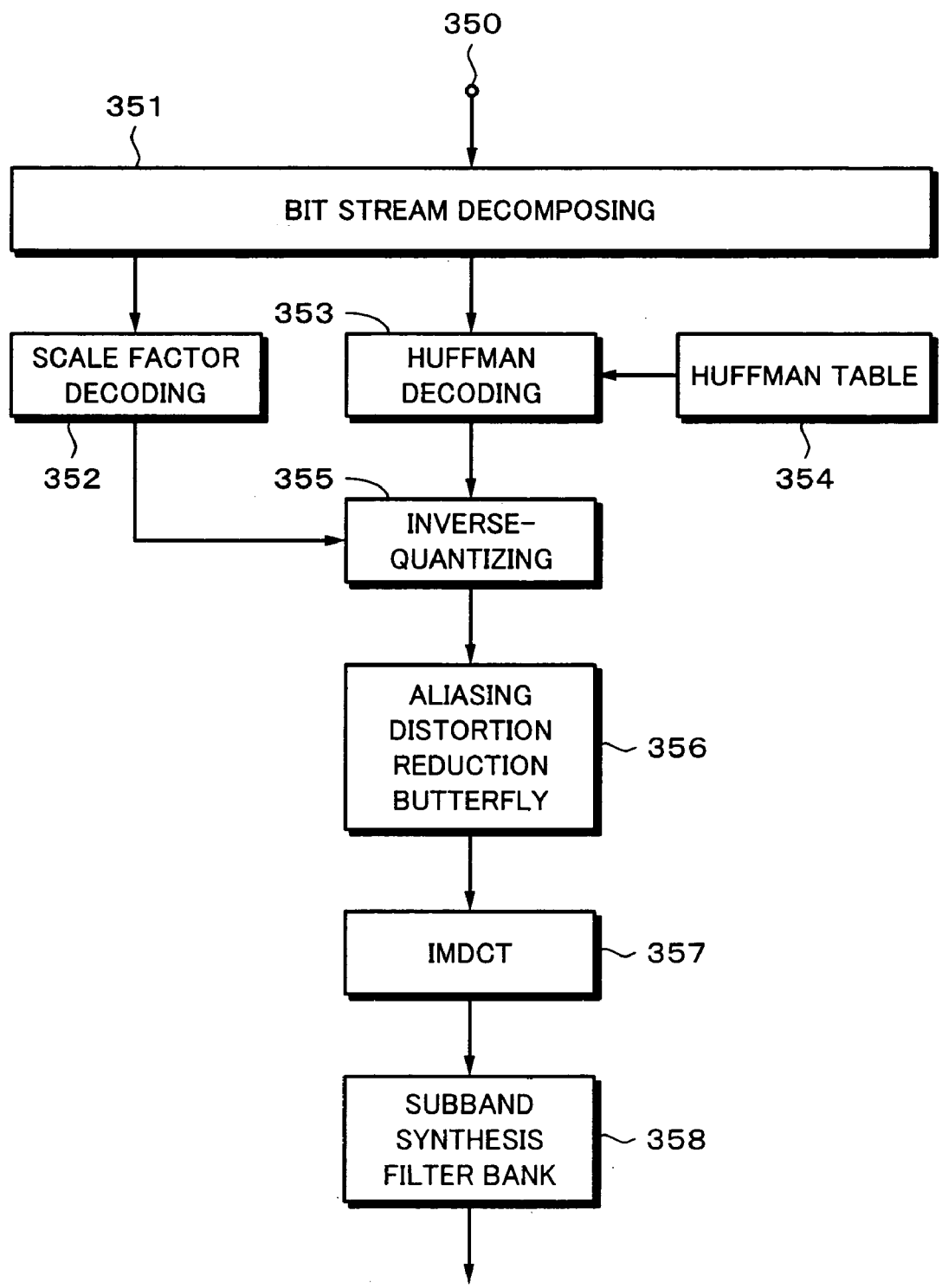
FIG. 26 is a block diagram showing a construction of an MP3 decoder.

FIG. 26 shows a construction of a MP3 decoder. In FIG. 26, an audio data stream compressed by MP3 is supplied to an input terminal 350. This MP3 stream is sent to a bit stream decomposing unit 351. In the bit stream decomposing unit, a header of a predetermined pattern is detected and the frame is decomposed.

The audio data which has been Huffman encoded and sent and the side information are outputted from the bit stream decomposing unit 351. The Huffman encoded audio data is sent to a Huffman decoding unit 353. In the Huffman decoding unit 353, decoding of the Huffman code is executed with reference to a Huffman table 354. An output of the Huffman decoding unit 353 is sent to an inverse-quantizing unit 355.

In a scale factor decoding unit 352, a scale of inverse quantization is decoded from the side information from the bit stream decomposing unit 351. In the inverse-quantizing unit 355, the inverse quantization is executed by using the inverse quantization scale in accordance with the case of the short block or with the case of the long block.

An output of the inverse-quantizing unit 355 is supplied to an aliasing distortion reduction butterfly unit 356. In the aliasing distortion reduction butterfly unit 356, a butterfly arithmetic operation is executed to reduce an aliasing distortion.

An output of the aliasing distortion reduction butterfly unit 356 is supplied to an IMDCT arithmetic operating unit 357. IMDCT arithmetic operations are executed by the IMDCT arithmetic operating unit 357. The number of IMDCT arithmetic operations is equal to 12 in the case of the short block or to 36 in the case of the long block.

An output of the IMDCT arithmetic operating unit 357 is supplied to a subband synthesis filter bank 358. In the subband synthesis filter bank 358, decoding data of 32 subbands is synthesized.

In the case of MP3, the head of the encode unit can be rapidly found by using an encode unit pointer indicative of the length in the range from the head of the packet data of the sector to the header of the complete encode unit of the sector instead of using the frame header.

Figure 27:
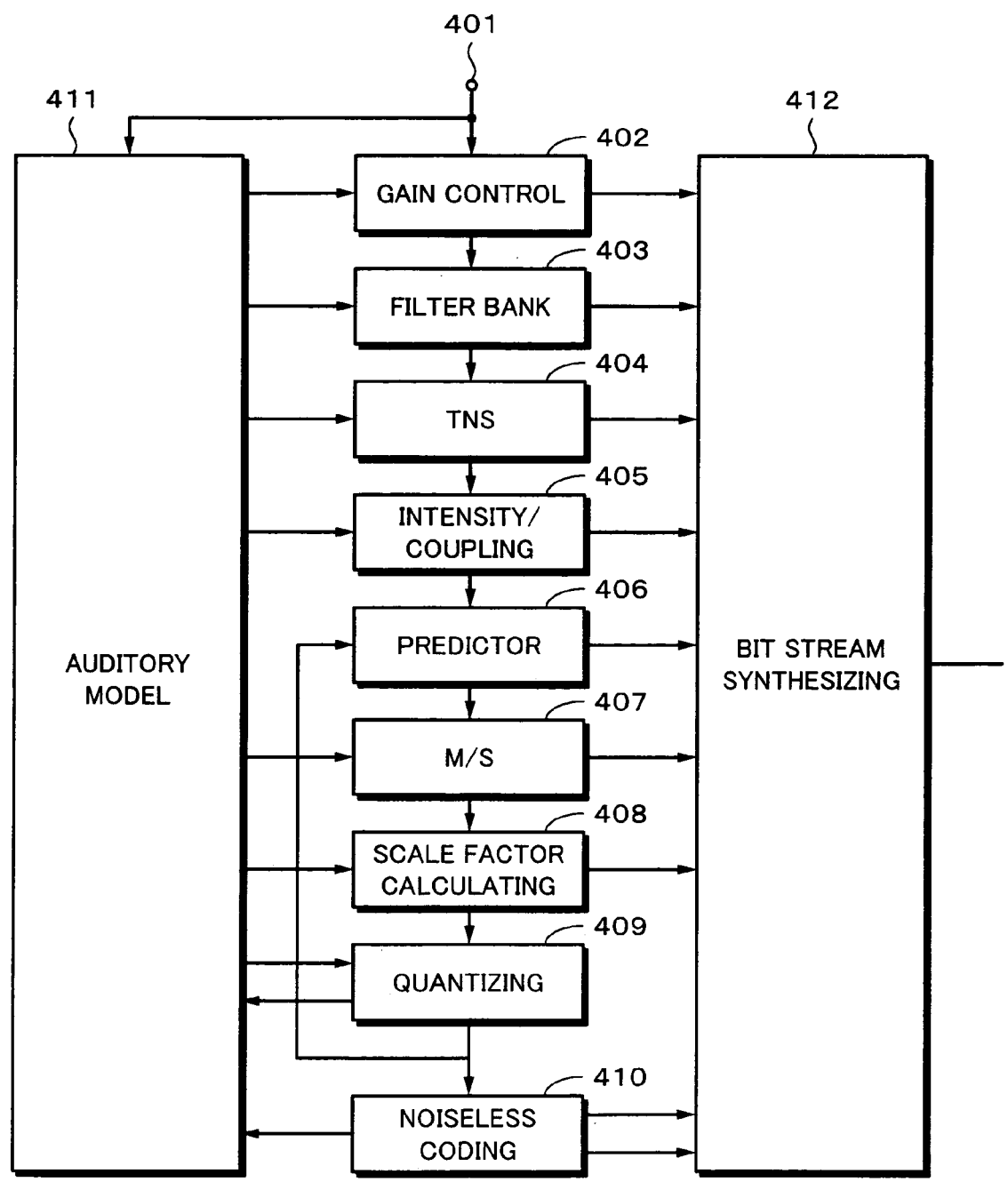
FIG. 27 is a block diagram showing a construction of an encoder of AAC.

The case of AAC will now be described. FIG. 27 shows encoding data of AAC. The AAC encoder has a gain control unit 402, a filter bank 403, a TNS 404, an intensity/coupling unit. 405, a predictor 406, an M/S unit 407, a scale factor calculating unit 408, a quantizing unit 409, a noiseless coding unit 410, an auditory model unit 411, and a bit stream unit 412.

AAC corresponds to 12 kinds of sampling frequencies in a range from 8 to 96 kHz and a standard channel construction corresponds to channels in a range from monaural to channel 7. The positions and the number of speakers in a multiplexer channel can be designated, that is, the number of front channels and the number of rear channels can be designated, thereby making it possible to cope with a more flexible multichannel construction.

According to AAC, three profiles, that is, a main profile, an LC profile, and an SSR profile are prepared in accordance with requirement conditions which are required from an application.

The main profile is provided for the highest sound quality and a predictor is used in order to give the highest priority to the sound quality.

According to the LC profile, to obtain a balance between the sound quality and the costs, the predictor is removed from the main profile and a band width and a degree of a TNS are restricted.

According to the SSR profile, by arranging 4-split band filters to front positions of MDCT, a size of RAM for MDCT of an unnecessary high band is reduced and minimized and a decoding scale can be reduced by selecting a reproduction band width.

The gain control unit 402 is used only for the SSR profile. The inputted signal of the time area is divided into four signals by a PQF band filter. The signals other than the signal of the lowest band are gain-controlled, thereby suppressing a preecho.

The filter bank 403 transforms the input signal of the time area into spectrum data of the frequency area by the MDCT transforming circuit. The transformation is executed while overlapping arithmetic operation block lengths by every 50%. For example, 2048 samples are transformed into 1024 MDCT coefficients. To suppress the foregoing preecho, a mechanism called block switching for switching the arithmetic operation block length of MDCT is used. The block length is switched to one of long, start, short, and stop every frame.

In the main and LC profiles, in the case of a stationary signal, the arithmetic operation length of MDCT is set to long, start, or stop of 2048 samples and transformed into 1024 MDCT coefficients. On the other hand, in the case of a transient signal, it is transformed into 128 MDCT coefficients as a short block of 256 samples. In the short block, by transforming the samples by using eight continuous short transformation lengths, the number of MDCT coefficients of the output is set to 1024 so as to coincide with those of other blocks.

In the case of the SSR profile, since the signals divided into four signals by PQF are transformed every band, the MDCT arithmetic operation length is equal to ¼ of the foregoing value. However, since the total number of MDCT coefficients of four bands is equal to 1024, it is equal to those of other profiles.

The TNS unit 404 regards the MDCT coefficients as a signal of time series and allows them to pass through an LPC filter, thereby concentrating noises onto a position of a large amplitude on the time base and improving sound quality of the signal of a low pitch frequency.

The predictor 406 is used only in the main profile. The encoder has the predictor every MDCT coefficient of up to 16 kHz and predictive errors are encoded, thereby improving sound quality of the stationary signal.

As stereophonic coding, there are an MS stereophonic, an intensity stereophonic, and a coupling. The MS stereophonic is a method of selecting either a mode of encoding the right and left channels or a mode of encoding a signal of the sum (L+R) and a signal of the difference (L−R) every scale factor band and encoding them. Code efficiency of the signal positioned to the center of the right and left channels can be improved. The intensity stereophonic is a method of encoding the sum signal of the right and left signals and a power ratio of the right and left channels by using characteristics such that the user feels the position of a sound source by a difference between powers of the right and left signals at a high frequency. The coupling can realize a method called voice over such that a background sound is encoded as a conventional multichannel signal and the background sound is encoded as a coupling channel. The intensity/coupling unit 405 sets the intensity stereophonic and the coupling. The M/S unit 407 sets the MS stereophonic.

Figure 28:
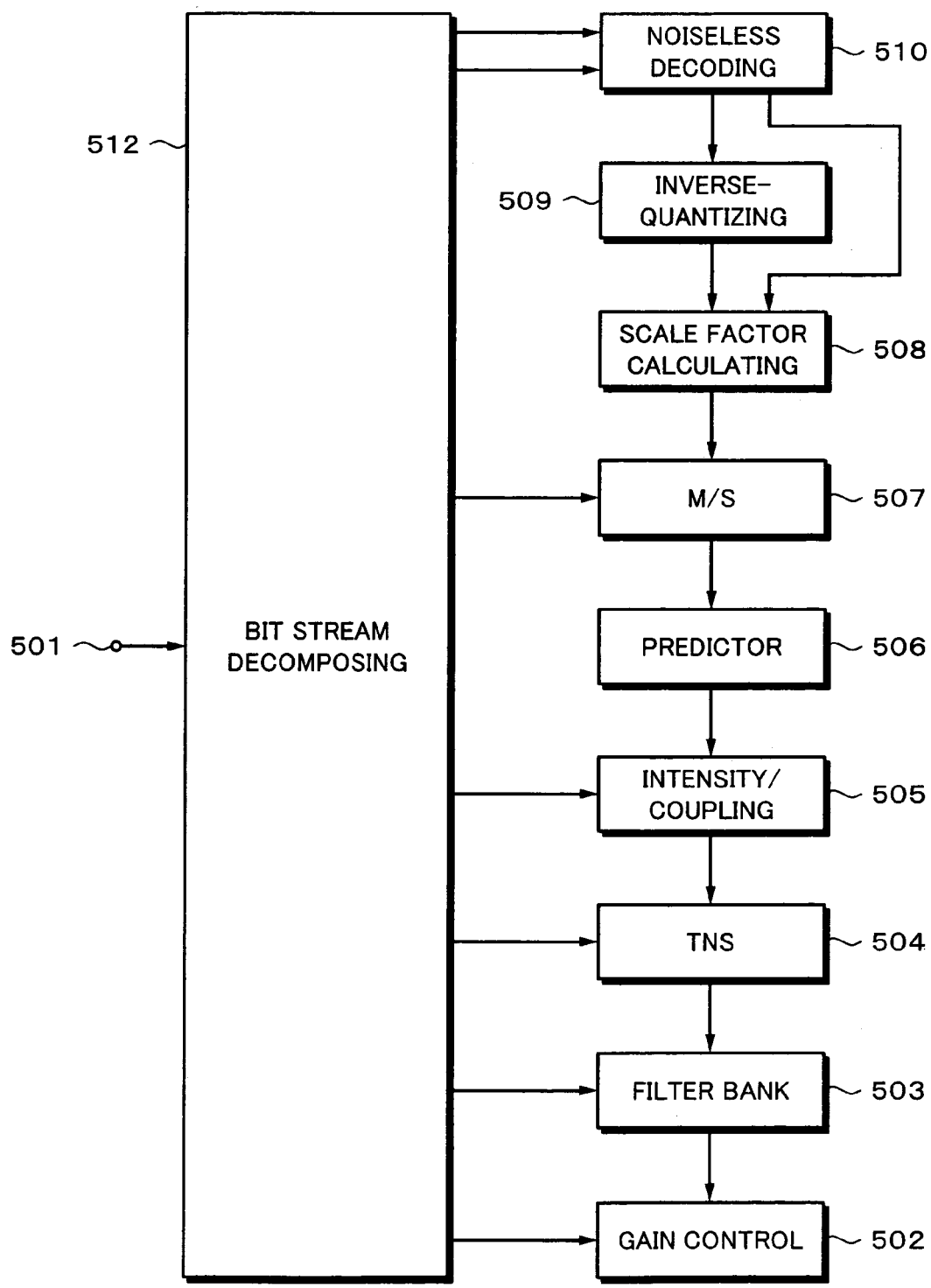
FIG. 28 is a block diagram showing a construction of an decoder of AAC.

FIG. 28 shows a decoder of AAC. The AAC decoder (FIG. 27) has a gain control unit 502, a filter bank 503, a TNS 404, an intensity/coupling unit 505, a predictor 506, an M/S unit 507, a scale factor calculating unit 508, an inverse-quantizing unit 509, a noiseless decoding unit 510, and a bit stream decomposing unit 512 in correspondence to the gain control unit 402, filter bank 403, TNS 404, intensity/coupling unit 405, predictor 406, M/S unit 407, scale factor calculating unit 408, quantizing unit 409, noiseless coding unit 410, auditory model unit 411, and bit stream unit 412 provided in the encoder.

As mentioned above, according to the embodiment of the invention, an arbitrary sector is accessed by using the encode unit pointer described in the CD2 stream header and the reproduction can be easily performed from the head of the encode unit existing in the sector.

Figure 29:
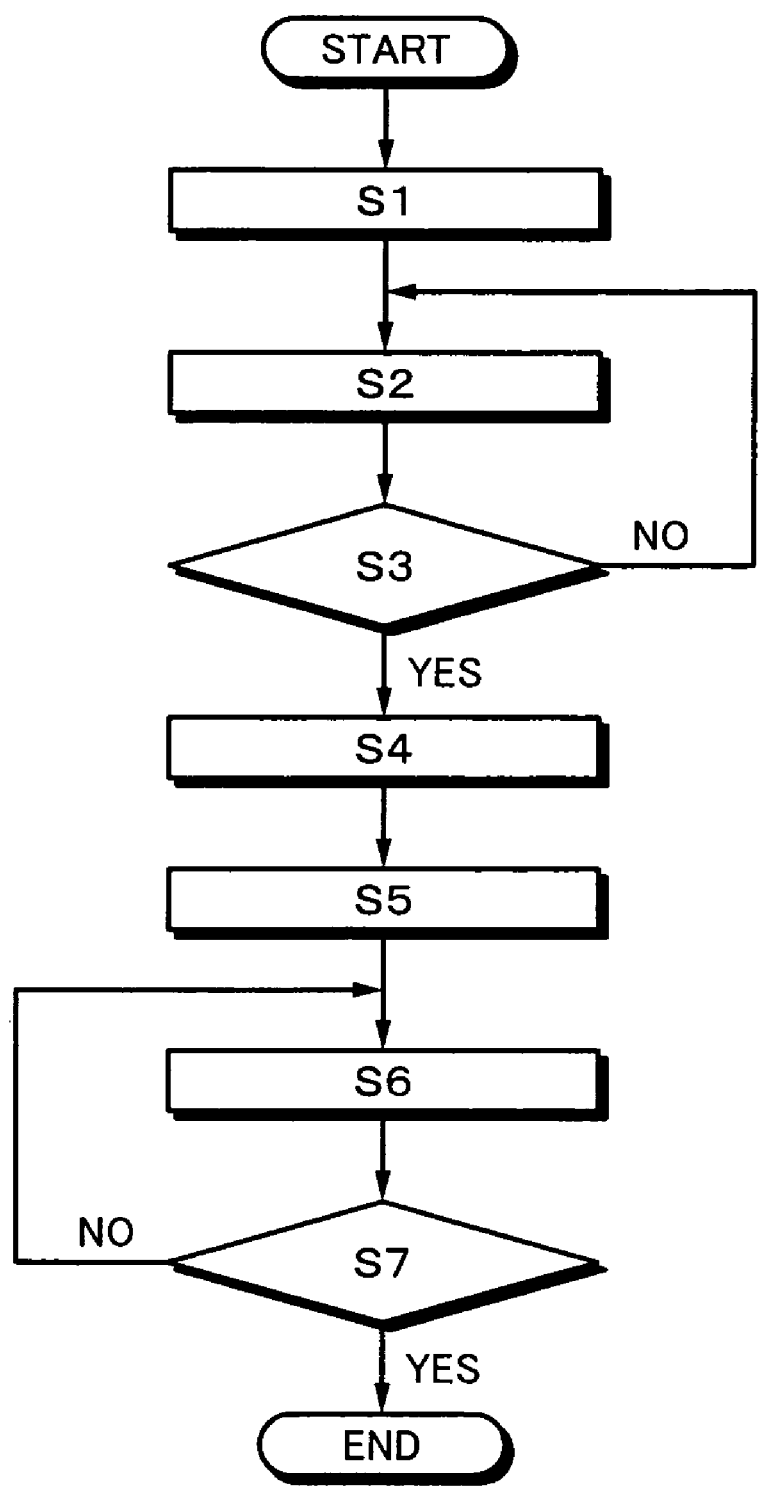
FIG. 29 is a flowchart for use in explanation of a data access.

FIG. 29 is a flowchart showing access control at the time of starting the reproduction by designating a sector in the fast-forward mode, fast-rewinding mode, or search mode.

In FIG. 29, when the sector is designated and the reproduction is started (step S1), the optical pickup 37 is accessed to the designated sector on the optical disc 1 (step S2).

Whether the access to the designated sector has been completed or not is discriminated (step S3). If it is determined that the access has been completed, the data is read out from the head of this sector and the information of the encode unit pointer of the CD2 stream header is read out (step S4).

When the information of the encode unit pointer is read, the decoding is started from the data of the encode unit existing at the position shown by the encode unit pointer and the data is reproduced (step S5).

When the reproduction is continuously performed (step S6), whether the reproduction is finished or not is discriminated (step S7). If the reproduction is not finished yet, the reproduction is continuously performed. If the reproduction is finished, the reproduction is finished here.

In the embodiment of the invention, the edit ID is inserted into the CD2 stream. Upon editing, an efficient edition can be executed by using the edit ID.

Figure 30:
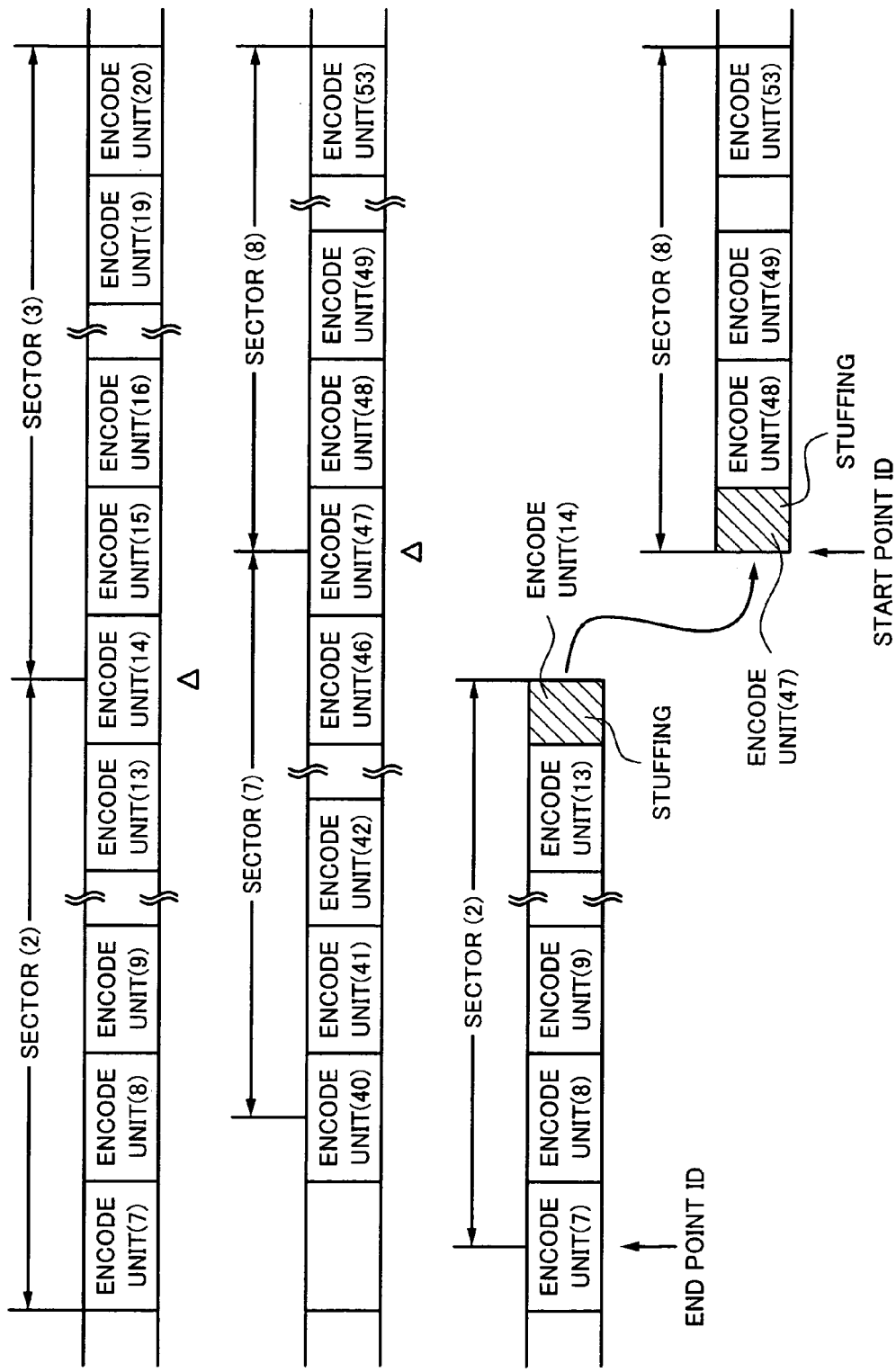
FIG. 30 is a schematic diagram for use in explanation of processes of an encode frame in an editing mode.

For example, as shown in FIG. 30, an edition is performed so as to disconnect the sectors (2) and (3), disconnect the sectors (7) and (8), and couple the sectors (2) and (8).

The edition is electronically performed. As an editing method, there are a method of completely rewriting the data on the optical disc 1 and a method of controlling reproducing order without rewriting the data on the optical disc 1.

In the case of FIG. 30, since a last encode unit (14) recorded in the sector (2) has been recorded over the sectors (2) and (3), if the sectors (2) and (3) are disconnected, the data becomes incomplete. In this case, an edit ID indicative of the end point is described in the edit ID of the CD2 stream header. At this time, stuffing can be also filled in the portion of the encode unit (14).

Since a first encode unit (47) recorded in the sector (8) has been recorded over the sectors (7) and (8), if the sectors (7) and (8) are disconnected, the data becomes incomplete. In this case, an edit ID indicative of the start point is described in the edit ID of the CD2 stream header. The stuffing length is described in the beginning of the data area.

If the sectors (2) and (8) are coupled, when the sector (2) is decoded, data of up to the encode unit (13) as a complete encode unit is reproduced and the portion of the encode unit (14) is skipped. The incomplete encode unit (47) existing in the beginning of the sector (8) is skipped and the reproduction is started from an encode unit (48) as a complete encode unit.

Figure 31:
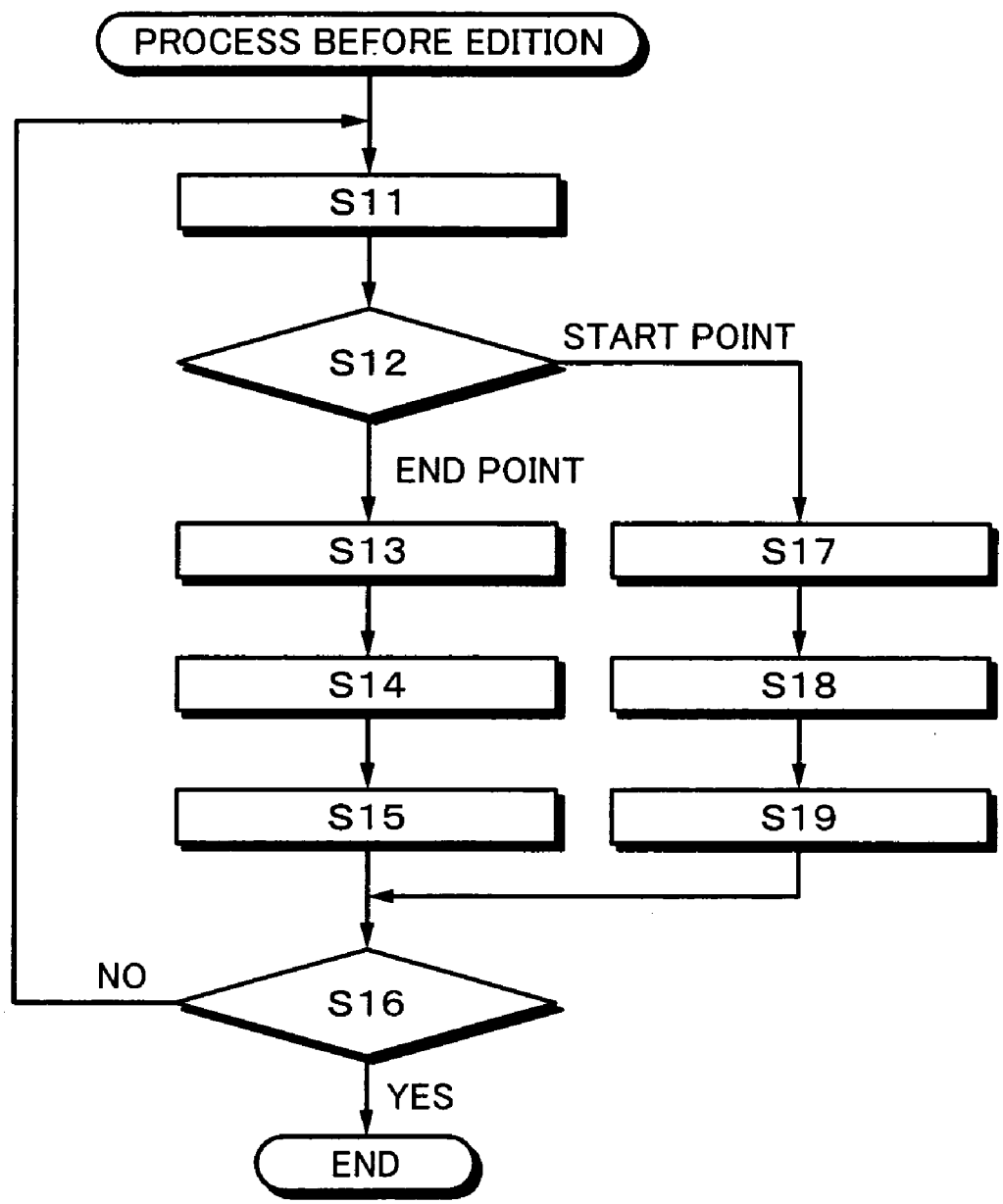
FIG. 31 is a flowchart for use in explanation of processes in the editing mode.

FIG. 31 is a flowchart showing processes upon editing. In FIG. 31, if an edit point is designated on a sector unit basis (step S11), whether the edit point is the end point or the start point is discriminated (step S12).

If it is determined that the edit point is the end point, the stuffing is inserted into the last incomplete encode unit in the sector (step S13). Information showing that the stuffing exists at a backward position is described in the stuffing ID of the CD2 stream header and the stuffing length is described in the last of the data (step S14). At the same time, information showing the endpoint is described in the edit ID (step S15). Whether the edition has been completed or not is discriminated (step S16).

If it is decided in step S12 that the edit point is the start point, the stuffing is inserted into the first incomplete encode unit in the sector (step S17). Information showing that the stuffing exists at a forward position is described in the stuffing ID of the CD2 stream header and the stuffing length is described in the beginning of the data (step S18). At the same time, information showing the start point is described in the edit ID (step S19). Whether the edition has been completed or not is discriminated (step S16).

In step S16, whether the editing process has been finished or not is discriminated. Similar processes are repeated until the editing process is finished.

In this example, although the stuffing data has been inserted into the incomplete encode unit, it is also possible to construct so as not to perform the stuffing.

Figure 32:
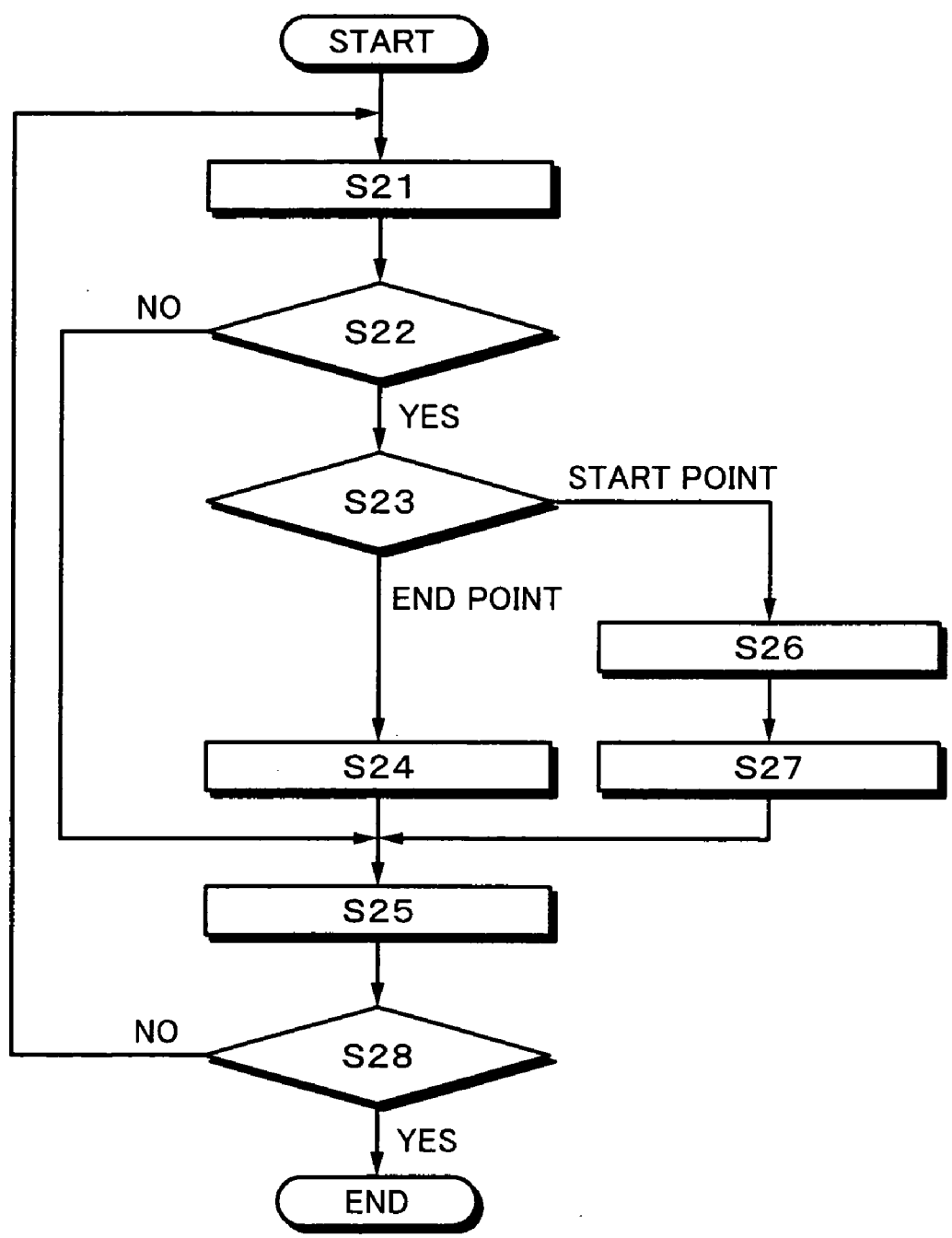
FIG. 32 is a flowchart for use in explanation of processes in the editing mode.

FIG. 32 shows processes at the time of reproducing the edit point as mentioned above. In FIG. 32, the edit ID of the CD2 stream header is read (step S21). Whether it is the edit point or not is discriminated (step S22). If it is the edit point, whether it is the end point or the start point is discriminated (step 823).

If it is determined in step S23 that the edit point is the end point, the reproduction is executed up to the complete encode unit, the last incomplete encode unit is skipped (step S24), and the continuous reproduction is executed (step S25).

If it is determined in step S23 that the edit point is the start point, the edit unit pointer is read out (step S26). The reproduction is started from the encode unit designated by the edit unit pointer (step S27) and the continuous reproduction is executed (step S25).

Whether the reproduction has been finished or not is discriminated (step S28). The processes are continued until the reproduction is finished.

Although the incomplete encode units have been stuffed in the foregoing example, it is also possible to certainly perform the stuffing up to a boundary of the encode units in each sector upon editing. That is, the edit point is certainly set to the boundary of the encode units. Since the position of the first complete encode unit is known by the CD2 stream header, the boundary of the encode units in each sector is known. If the edit point is certainly assumed to be the boundary of the encode units, when the edit points are coupled, they are coupled at the boundary of the encode units. After the edition, the continuous reproduction can be performed.

In the above example, the position of the head of the complete encode unit of the sector has been set to the encode unit pointer. However, if it is set to a position of a desired one of the complete encode units existing in the sector instead of the position of the complete encode unit of the sector, it is possible to designate the reproducing position or edit on a unit basis of the encode unit.

That is, according to the specification of CD-ROM Mode-1, the access unit is the sector and usually, it is impossible to designate the encode unit in the sector and reproduce. However, if the position of the desired one of the complete encode units existing in the sector is preliminarily described by the encode unit pointer, it is possible to designate and access the desired encode unit in the sector. This method is effective particularly in the case of performing the severe edition.

In the foregoing example, the pack header is set to the fixed value of 14 bytes, the PES header is set to the fixed value of 14 bytes, the CD2 stream header is set to the fixed value of 4 bytes, and the data of one packet is set to 2016 bytes. Therefore, the PES packet length (PES_packet_length) in the PES header is certainly equal to 2028 bytes. From this point, it is also possible to detect the PES packet length in the PES packet, discriminate whether its value is equal to 2028 bytes or not, and use a discrimination result for discrimination about whether the disc is a disc of CD2 or not.

Although the CD2 stream header has been set to 4 bytes in the above example, this size of header is not limited to it. However, if the CD2 stream header is set to 4 bytes, the data length of one packet is equal to 2016 bytes and this value is a multiple of 8. For example, in the block encryption like DES or triple DES, the encryption is executed on a 8-byte unit basis. Assuming that the data length of one packet is equal to 2016 bytes, the data of one packet is a multiple of 8 bytes and it is preferable for encryption.

Although the forward stuffing and the backward stuffing have been executed when the stuffing is performed in the above example, only either the forward stuffing or the backward stuffing can be also executed. Further, three kinds of stuffing, that is, the forward stuffing, the backward stuffing, and bidirectional stuffing of the forward and backward can be also executed.

In the above example, the stuffing ID showing whether the stuffing has been performed to the CD2 stream header or not has been provided and the stuffing length has been described in backward 11 bits of the data (in the case of the backward stuffing). However, the stuffing ID and the stuffing length can be also added as follows in accordance with the case where the stuffing is not performed, the case of performing the stuffing of 1 byte, and the case of performing the stuffing of 2 or more bytes.

FIG. 33 shows an example in which the stuffing ID and the stuffing length are described in accordance with the case where the stuffing is not performed, the case of performing the stuffing of 1 byte, and the case of performing the stuffing of 2 or more bytes.

Figure 33A:
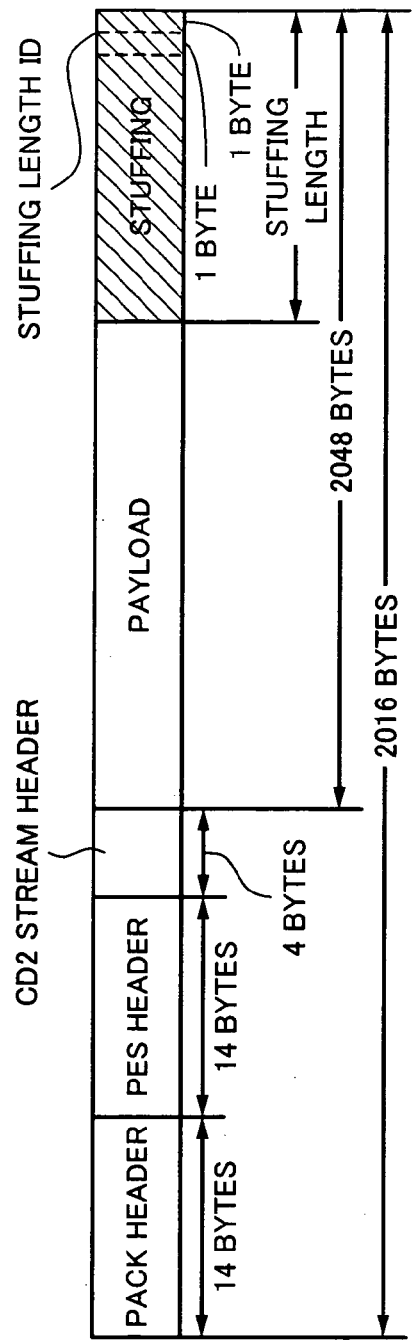
FIGS. 33A and 33B are schematic diagrams for use in explanation of a stuffing process.

As shown in FIG. 33A, one pack consists of 2048 bytes. A pack header of 14 bytes and a PES header of 14 bytes are provided at the head of the pack, and subsequently, a CD2 stream header of 4 bytes is provided. Subsequently, a CD2 payload area of 2016 bytes is provided. As a payload, an encrypted stream or a stream which is not encrypted can be also used.

When the number of bytes of one pack is not equal to 2048 bytes, stuffing can be inserted to the end of the pack. If the payload is not encrypted, the stuffing is set to, for example, all "1". In the case of the encrypted stream, the stuffing is performed by random numbers in consideration of the security.

A stuffing length ID is provided to the last of the pack. The stuffing length ID indicates a stuffing length of the inserted stuffing bytes.

If the stuffing is not performed, the stuffing length ID is not provided. In the case of performing the stuffing of 1 byte, the stuffing length ID is set to a fixed value "00000001" of one byte. In the case of performing the stuffing of 2 or more bytes, a value of those two bytes indicates the stuffing length.

Figure 33B:
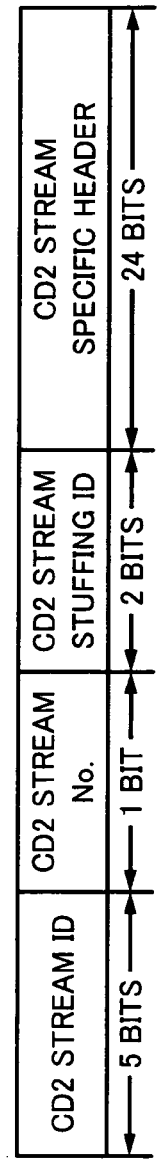

As shown in FIG. 33B, the CD2 stream header comprises: a CD2 stream header of 5 bits; a CD2 stream number of 1 bit; a CD2 stream stuffing ID of 2 bits; and a CD2 stream specific header of 24 bits. The CD2 stream specific header can be used as an encode unit pointer or an encode ID.

The CD2 stream ID (5 bits) is a number showing the kind of stream. The CD2 stream ID is defined as follows.
00000 AAC audio
00001 ATRAC3 audio
00010 MP3 audio
00011 reserve
00100 LPCM audio
00101~00111 reserve
01000 still image stream
01001~11111 reserve Subsequently, the CD2 stream number of 1 bit is provided. The CD2 stream number indicates whether the stream is a CD2 stream or not. When it is equal to "0", the stream is determined to be the CD2 stream, and the CD2 stream ID is defined in the above table. When it is equal to "1", the CD2 stream ID is not defined.

Figure 34A:
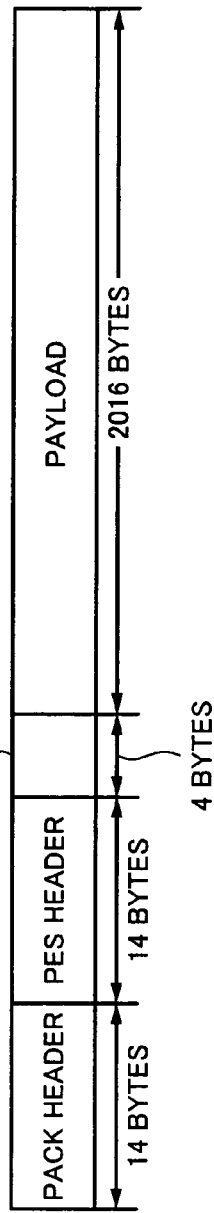
FIGS. 34A to 34C are schematic diagrams for use in explanation of a stuffing process.

Subsequently, the CD2 stream stuffing ID of 2 bits is provided. The CD2 stream stuffing ID shows the presence or absence of the stuffing. Further, if the stuffing was performed, the CD2 stream stuffing ID shows whether the stuffing of 1 byte has been executed or the stuffing of 2 or more bytes has been executed. The CD2 stream stuffing ID is defined as follows.
00 the stuffing is not performed
01 the stuffing of 1 byte has been executed
10 the stuffing of 2 or more bytes has been executed to the encrypted payload
11 the stuffing of 2 or more bytes has been executed to the payload which is not encrypted When the stuffing is not performed, as shown in FIG. 34A, the CD2 stream stuffing ID is equal to "00", the stuffing length ID at the last of the pack is not provided, and the whole payload area of 2016 bytes is filled with stream data.

Figure 34B:
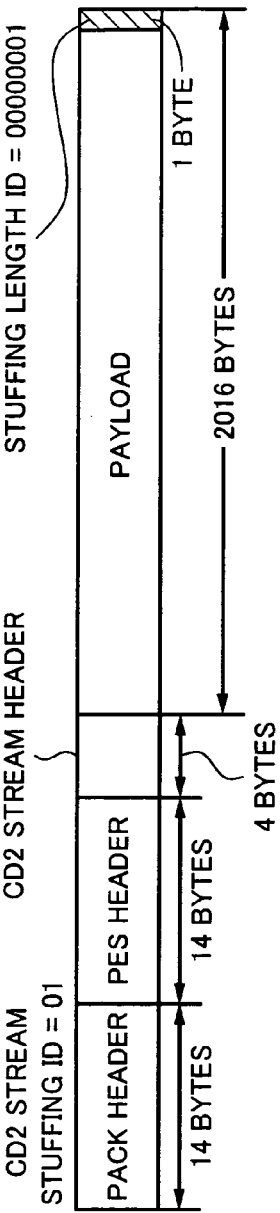

In the case of performing the stuffing of 1 byte, as shown in FIG. 34B, the CD2 stream header is equal to "01" and the stuffing length ID of 1 byte is added to the last of the pack. A value of the stuffing length ID of 1 byte is set to "00000001". In this case, the insertion of the stuffing length ID of 1 byte results in the execution of the stuffing of 1 byte.

Figure 34C:
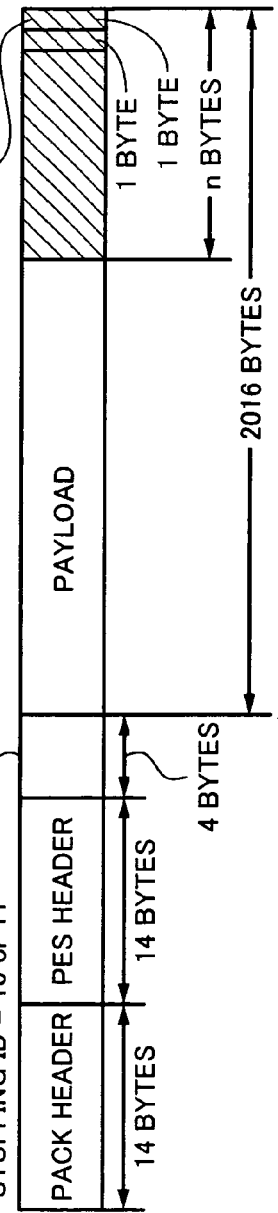
Figure 35A:
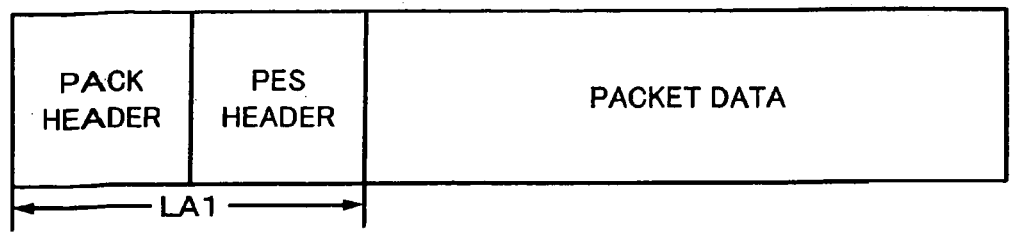
FIGS. 35A and 35B are schematic diagrams for use in explanation of a conventional stuffing process.
Figure 35B:
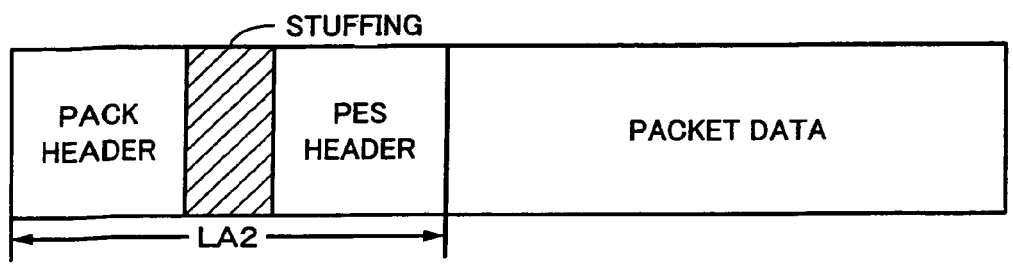
Figure 36A:
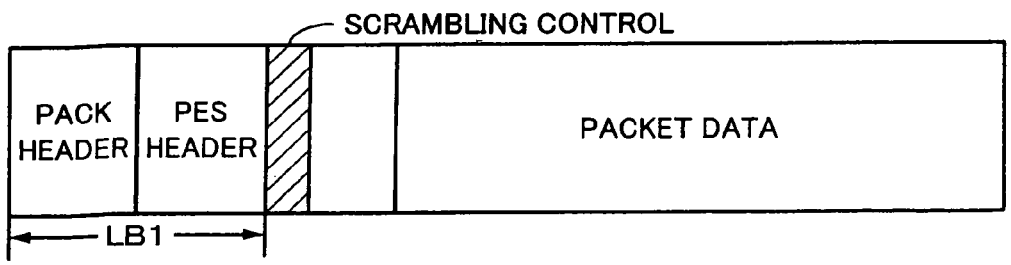
FIGS. 36A and 36B are schematic diagrams for use in explanation of a conventional stuffing process.
Figure 36B:
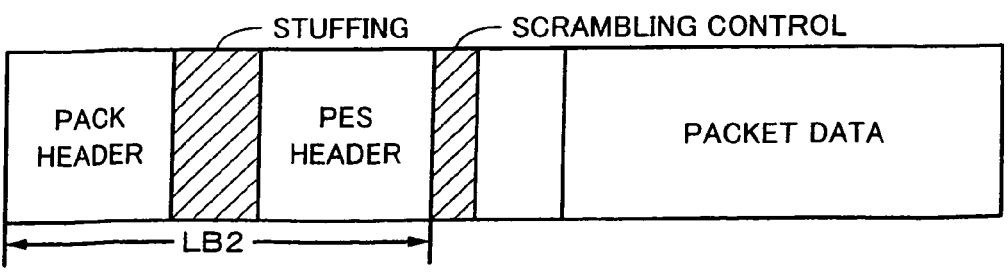
Figure 37:
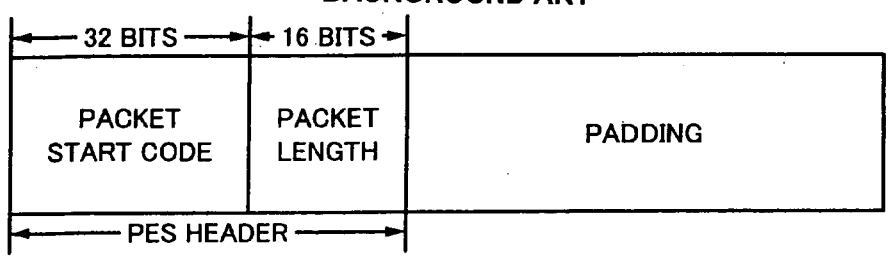
FIG. 37 is a schematic diagram for use in explanation of a padding packet.
Figure 38:
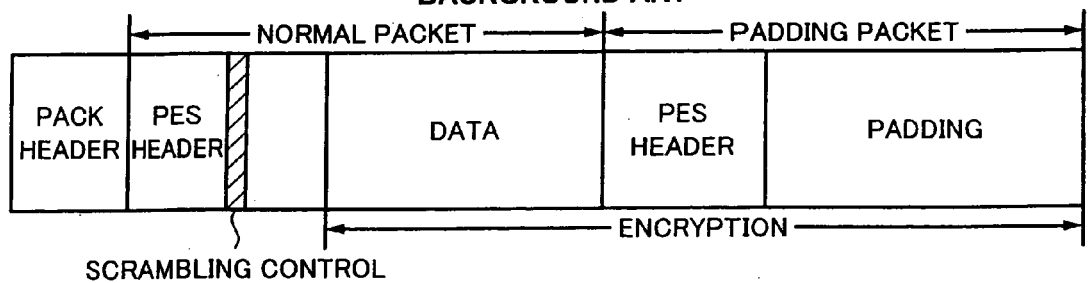
FIG. 38 is a schematic diagram for use in explanation of a conventional padding process.

If the stuffing of 2 or more bytes was performed to the encrypted payload or the payload which is not encrypted, as shown in FIG. 34C, the CD2 stream header is equal to "10" or "11" and the stuffing of n bytes is executed to the payload. The stuffing length ID of 2 bytes is provided at the last of the pack. A value of the stuffing length ID is set to the stuffing length n. In this case, (n−2) bytes are inserted as stuffing bytes. The stuffing of a total of n bytes is executed by adding the stuffing length ID of 2 bytes.

As mentioned above, in this example, the CD2 stream stuffing ID is provided for the CD2 stream header and the stuffing length ID is provided at the last of the pack. The CD2 stream stuffing ID indicates whether the stuffing has been performed or is the stuffing of 1 byte or the stuffing of 2 or more bytes. The stuffing length ID indicates the stuffing length.

When the CD2 stream stuffing ID is equal to "00", it is regarded that the stuffing is not performed and the process is executed.

When the CD2 stream stuffing ID is equal to "01", the last one byte of the payload area is processed as stuffing data. At this time, since the value of the last one byte of the payload area is equal to "00000001", matching performance with the case of the stuffing of 1 byte is kept.

When the CD2 stream stuffing ID is equal to "10" or "11", a value of the stuffing length ID of the last 2 bytes of the payload area is detected. In accordance with the value n shown by the stuffing length ID, n bytes from the last of the payload are processed as stuffing data.

Although the case of encoding the audio data has been described above, naturally, the invention is also effective in the case of encoding an image. In the case of an image of MPEG2, although it comprises a sequence layer, a GOP layer, a picture layer, a slice layer, a macro block layer, and a block layer, for example, the slice layer or picture layer serving as a unit of the variable length encoding can be considered as an encode unit.

In the above description, although the data which has been packetized and formed as pack data is recorded onto the disc of CD2 in accordance with the CD-ROM, the invention is also effective when the data is transmitted. For example, if the system is constructed in a manner such that the data which has been packetized and formed as pack data can be distributed via the network, the invention is suitable when the data is downloaded and recorded onto the disc in accordance with the CD-ROM.

According to the invention, on the data recording medium which is divided into sectors of a predetermined length and can be accessed on the sector unit basis and on which contents data is recorded, when the encoded contents data is divided every predetermined length, the header is added, the data is packetized, the header is further added to the packet to thereby form the pack data, and the resultant data is recorded, if the stuffing is necessary, the stuffing data is inserted to, for example, the last of the data area of the packet. The information of the stuffing is described in, for example, the CD2 stream header and its length is described in, for example, the last of the data. Therefore, there is no need to perform the stuffing to the pack header and the length of pack header can be fixed. Thus, the start position of the packet data can be easily detected. The scrambling control flag added to the packet header can be easily extracted and the decrypting process of the encryption becomes easy.

According to the invention, the stuffing data is inserted to, for example, the last of the data area of the packet. Therefore, there is no need to provide the padding packet. Since the padding packet is not used, the data of the small padding or stuffing less than 6 bytes can be inserted. Since such a padding packet is not provided, a situation such that the PES header is encrypted is prevented and the problem does not occur when the encryption is performed.

INDUSTRIAL APPLICABILITY

As mentioned above, the invention is suitable when it is used for the recording medium which is divided into sectors of a predetermined length and can be accessed on a sector unit basis, for example, like an optical disc of CD2, the data recording method and apparatus for recording the data of contents onto such a recording medium, and the data transmitting method and apparatus.

The invention claimed is:

1. A data recording medium which is divided into sectors of a predetermined length and can be accessed on a sector unit basis and on which content data is recorded,
wherein encoded content data of a predetermined length is obtained, a packet header is added, and the content data is packetized to generate a packet,
a header pack is added to said generated packet to thereby form pack data,
said pack data is recorded into a sector, and
when a size of said content data which has been packetized and further formed as pack data does not correspond to a size of said sector, said packet header is set to a fixed length and stuffing data is inserted into the content data of said packet, wherein information showing whether all of said stuffing data has been inserted in a last portion or a forefront portion of the packet is recorded into the packet header.

2. A data recording medium according to claim 1, wherein said stuffing data is a fixed value.

3. A data recording medium according to claim 1, wherein said stuffing data is random numbers.

4. A data recording method of recording content data onto a recording medium divided into sectors of a predetermined length, wherein the medium can be accessed on a sector unit basis, the method comprising:

obtaining encoded content data of a predetermined length;

adding a packet header and packetizing the content data to generate a packet;

adding a pack header to said generated packet to form pack data;

recording said pack data into a sector on said recording medium; and when it is determined that stuffing data is required, setting said packet header to a fixed length and inserting the stuffing data into the content data of said packet, wherein information showing whether all of said stuffing data has been inserted in a last portion or a forefront portion of the packet is recorded into the packet header.

5. A data recording method according to claim 4, wherein identification information showing that said stuffing data has been inserted is recorded into the header of said packet.

6. A data recording method according to claim 4, wherein a length of said stuffing data is recorded to a predetermined position of the data of said packet.

7. A data recording method according to claim 4, wherein said stuffing data is recorded in a last portion in the data of said packet.

8. A data recording method according to claim 4, wherein said stuffing data is recorded in a forefront portion in the data of said packet.

9. A data recording method according to claim 4, wherein said stuffing data is recorded in a last portion or a forefront portion in the data of said packet, and information of a length of said stuffing data is recorded in the last portion or the forefront portion in the data of said packet.

10. A data recording method according to claim 4, wherein said stuffing data is a fixed value.

11. A data recording method according to claim 4, wherein said stuffing data is random numbers.

12. A data recording method according to claim 6, wherein when said stuffing data does not exist, information of the length of said stuffing data is eliminated.

13. A data recording method according to claim 4, wherein the data which has been packetized and further formed as pack data in accordance with a CD-ROM is recorded in said sector.

14. A data recording method according to claim 4, wherein said packetizing and pack data forming process conforms with MPEG (Moving Picture Coding Experts Group)-PS (Program Stream).

15. A data recording method according to claim 4, wherein said content data is encoded by ATRAC (Adaptive TRansform Acoustic Coding), ATRAC2, or ATRAC3.

16. A data recording method according to claim 4, wherein said content data is encoded by MP3 (MPEG1 Audio Layer-3).

17. A data recording method according to claim 4, wherein said content data is encoded by AAC (MPEG2 Advanced Audio Coding).

18. A data recording apparatus for recording content data onto a recording medium divided into sectors of a predetermined length, wherein the medium can be accessed on a sector unit basis, the apparatus comprising:

means for obtaining encoded content data of a predetermined length;

means for adding a packet header and packetizing the content data to generate a packet;

means for adding a pack header to said generated packet to form pack data;

means for recording said pack data into a sector on said recording medium; and means for, when it is determined that stuffing data is required, setting said packet header to a fixed length and inserting the stuffing data into the content data of said packet, wherein information showing whether all of said stuffing data has been inserted in a last portion or a forefront portion of the packet is recorded into the packet header.

19. A data recording apparatus according to claim 18, wherein identification information showing that said stuffing data has been inserted is recorded into the header of said packet.

20. A data recording apparatus according to claim 18, wherein a length of said stuffing data is recorded to a predetermined position of the data of said packet.

21. A data recording apparatus according to claim 18, wherein said stuffing data is recorded in a last portion in the data of said packet.

22. A data recording apparatus according to claim 18, wherein said stuffing data is recorded in a forefront portion in the data of said packet.

23. A data recording apparatus according to claim 18, wherein said stuffing data is recorded in a last portion or a forefront portion in the data of said packet, and information of a length of said stuffing data is recorded in the last portion or the forefront portion in the data of said packet.

24. A data recording apparatus according to claim 18, wherein said stuffing data is a fixed value.

25. A data recording apparatus according to claim 18, wherein said stuffing data is random numbers.

26. A data recording apparatus according to claim 20, wherein when said stuffing data does not exist, information of the length of said stuffing data is eliminated.

27. A data recording apparatus according to claim 18, wherein the data which has been packetized and further formed as pack data in accordance with a CD-ROM is recorded in said sector.

28. A data recording apparatus according to claim 18, wherein said packetizing and pack data forming process conforms with MPEG (Moving Picture Coding Experts Group)-PS (Program Stream).

29. A data recording apparatus according to claim 18, wherein said content data is encoded by ATRAC (Adaptive TRansform Acoustic Coding), ATRAC2, or ATRAC3.

30. A data recording apparatus according to claim 18, wherein said content data is encoded by MP3 (MPEG1 Audio Layer-3).

31. A data recording apparatus according to claim 18, wherein said content data is encoded by AAC (MPEG2 Advanced Audio Coding).

32. A data transmitting method, comprising:
obtaining encoded content data of a predetermined length;
adding a packet header and packetizing the content data to generate a packet;
adding a pack header to said generated packet to form pack data;
transmitting said pack data; and
when it is determined that stuffing data is required, setting said packet header to a fixed length and inserting the stuffing data into the content data of said packet,
wherein information showing whether all of said stuffing data has been inserted in a last portion or a forefront portion of the packet is included in the packet header.

33. A data transmitting method according to claim 32, wherein identification information showing that said stuffing data has been inserted is described into the header of said packet.

34. A data transmitting method according to claim 32, wherein a length of said stuffing data is described to a predetermined position of the data of said packet.

35. A data transmitting method according to claim 32, wherein said stuffing data is described in a last portion in the data of said packet.

36. A data transmitting method according to claim 32, wherein said stuffing data is described in a forefront portion in the data of said packet.

37. A data transmitting method according to claim 32, wherein said stuffing data is recorded in a last portion or a forefront portion in the data of said packet, and information of a length of said stuffing data is recorded in the last portion or the forefront portion in the data of said packet.

38. A data transmitting method according to claim 32, wherein said stuffing data is a fixed value.

39. A data transmitting method according to claim 32, wherein said stuffing data is random numbers.

40. A data transmitting method according to claim 34, wherein when said stuffing data does not exist, information of the length of said stuffing data is eliminated.

41. A data transmitting method according to claim 32, wherein the data which has been packetized and further formed as pack data in accordance with a CD-ROM is described in said sector.

42. A data transmitting method according to claim 32, wherein said packetizing and pack data forming process conforms with MPEG (Moving Picture Coding Experts Group)-PS (Program Stream).

43. A data transmitting method according to claim 32, wherein said content data is encoded by ATRAC (Adaptive TRansform Acoustic Coding), ATRAC2, or ATRAC3.

44. A data transmitting method according to claim 32, wherein said content data is encoded by MP3 (MPEG1 Audio Layer-3).

45. A data transmitting method according to claim 32, wherein said content data is encoded by AAC (MPEG2 Advanced Audio Coding).

46. A data transmitting apparatus, comprising:
means for obtaining encoded content data of a predetermined length;
means for adding a packet header and packetizing the content data to generate a packet;
means for adding a pack header to said generated packet to form pack data;
means for transmitting said pack data; and
means for, when it is determined that stuffing data is required, setting said packet header to a fixed length and inserting the stuffing data into the content data of said packet,
wherein information showing whether all of said stuffing data has been inserted in a last portion or a forefront portion of the packet is included in the packet header.

47. A data transmitting apparatus according to claim 46, wherein identification information showing that said stuffing data has been inserted is described into the header of said packet.

48. A data transmitting apparatus according to claim 46, wherein a length of said stuffing data is described to a predetermined position of the data of said packet.

49. A data transmitting apparatus according to claim 46, wherein said stuffing data is described in a last portion in the data of said packet.

50. A data transmitting apparatus according to claim 46, wherein said stuffing data is described in a forefront portion in the data of said packet.

51. A data transmitting apparatus according to claim 46, wherein said stuffing data is recorded in a last portion or a forefront portion in the data of said packet, and information of a length of said stuffing data is recorded in the last portion or the forefront portion in the data of said packet.

52. A data transmitting apparatus according to claim 46, wherein said stuffing data is a fixed value.

53. A data transmitting apparatus according to claim 46, wherein said stuffing data is random numbers.

54. A data transmitting apparatus according to claim 48, wherein when said stuffing data does not exist, information of the length of said stuffing data is eliminated.

55. A data transmitting apparatus according to claim 46, wherein the data which has been packetized and further formed as pack data in accordance with a CD-ROM is described in said sector.

56. A data transmitting apparatus according to claim 46, wherein said packetizing and pack data forming process conforms with MPEG (Moving Picture Coding Experts Group)-PS (Program Stream).

57. A data transmitting apparatus according to claim 46, wherein said content data is encoded by ATRAC (Adaptive TRansform Acoustic Coding), ATRAC2, or ATRAC3.

58. A data transmitting apparatus according to claim 46, wherein said content data is encoded by MP3 (MPEG1 Audio Layer-3).

59. A data transmitting apparatus according to claim 46, wherein said content data is encoded by AAC (MPEG2 Advanced Audio Coding).

* * * * *

UNITED STATES PATENT AND TRADEMARK OFFICE
CERTIFICATE OF CORRECTION

PATENT NO. : 7,126,892 B2
APPLICATION NO. : 10/311654
DATED : October 24, 2006
INVENTOR(S) : Yoichiro Sako et al.

It is certified that error appears in the above-identified patent and that said Letters Patent is hereby corrected as shown below:

Column 27, line 24, change "(step 823)." to --(step S23)--.

Signed and Sealed this

Fourth Day of March, 2008

JON W. DUDAS
*Director of the United States Patent and Trademark Office*